United States Patent
Hata et al.

(10) Patent No.: US 6,524,498 B1
(45) Date of Patent: Feb. 25, 2003

(54) ELECTROLYTE COMPOSITION FOR ELECTRIC DOUBLE LAYER CAPACITOR, SOLID POLYMER ELECTROLYTE COMPOSITION FOR POLARIZABLE ELECTRODE, POLARIZABLE ELECTRODE, AND ELECTRIC DOUBLE LAYER CAPACITOR

(75) Inventors: Kimiyo Hata, Chiba (JP); Takaya Sato, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/701,032

(22) PCT Filed: Mar. 22, 2000

(86) PCT No.: PCT/JP00/01735

§ 371 (c)(1),
(2), (4) Date: Nov. 22, 2000

(87) PCT Pub. No.: WO00/57440

PCT Pub. Date: Sep. 28, 2000

(30) Foreign Application Priority Data

Mar. 23, 1999 (JP) .......................................... 11-078086
Mar. 23, 1999 (JP) .......................................... 11-078087

(51) Int. Cl.[7] ................................................. H01B 1/00
(52) U.S. Cl. ...................... 252/500; 429/209; 361/502; 361/508; 361/512; 525/58; 525/59; 525/60; 525/61
(58) Field of Search ............................... 252/500, 62.2; 429/209; 525/58–61; 361/502, 508, 512

(56) References Cited

U.S. PATENT DOCUMENTS 5,158,810 A * 10/1992 Oishi et al. .................... 525/60
5,789,106 A * 8/1998 Rosenmeier et al. ........ 252/62.2
5,849,840 A * 12/1998 Maruhashi et al. ........ 525/328.9
6,288,888 B1 * 9/2001 Sakata et al. ................ 361/502

FOREIGN PATENT DOCUMENTS

| EP | 360508 | 9/1989 |
| JP | 56-70623 | 6/1981 |
| JP | 60-171714 | 9/1985 |
| JP | 2-87482 | 3/1990 |
| JP | 4-296347 | 10/1992 |
| JP | 6-150941 | 5/1994 |
| JP | 7-224202 | 8/1995 |

* cited by examiner

Primary Examiner—Yogendra N. Gupta
Assistant Examiner—Lallambella Vijayakumar
(74) Attorney, Agent, or Firm—Birch, Stewart, Kolasch & Birch, LLP

(57) ABSTRACT

An electrolyte composition and a solid polymer electrolyte for electric double-layer capacitors are endowed with high ionic conductivity, high tackiness and shape retention. The invention is also directed at a polarizable electrode-forming composition and a polarizable electrode having a high adhesion, high dielectric properties, and excellent shape retention. A high-performance electric double-layer capacitor arrived at using the above compositions and components is additionally disclosed.

16 Claims, 1 Drawing Sheet

ELECTROLYTE COMPOSITION FOR ELECTRIC DOUBLE LAYER CAPACITOR, SOLID POLYMER ELECTROLYTE COMPOSITION FOR POLARIZABLE ELECTRODE, POLARIZABLE ELECTRODE, AND ELECTRIC DOUBLE LAYER CAPACITOR

This application is the national phase under 35 U.S.C. §371 of PCT International Application No. PCT/JP00/01735 which has an International filing date of Mar. 22, 2000 which designated the United States of America, the entire contents of which are hereby incorporated by reference.

BACKGROUND OF THE INVENTION

1. Technical Field

The present invention relates to electrolyte compositions and solid polymer electrolytes for electric double-layer capacitors that are highly suitable for use in such applications as backup power supplies for various types of electronic equipment. The invention also relates to polarizable electrode-forming compositions and polarizable electrodes, as well as to electric double-layer capacitors arrived at using these compositions and components.

2. Background Art

Electric double-layer capacitors are currently employed as backup power supplies for computers memories. These capacitors, which make use of the electric double layer that forms at the interface between an electrode and a liquid electrolyte, have a small size, a large capacitance and a long cycle life.

Recent rapid advances in portability and cordless features in consumer electronic devices such as mobile phones have led to a heightened demand for electric double-layer capacitors. Because electric double-layer capacitors which use nonaqueous electrolytes have a higher voltage and energy density than those made using aqueous electrolytes, they are viewed as especially promising and have been the object of accelerated research efforts.

Secondary cells have hitherto been used for such applications. However, electric double-layer capacitors have come into widespread use as lower power consumption by electronic equipment has reduced backup current requirements, and because of the longer cycle life and broader service temperature range of the capacitors themselves.

Such electric double-layer capacitors have a construction in which a positive and a negative electrode (polarizable electrodes) are provided on a left-right pair of current collectors.

The positive and negative electrodes (polarizable electrodes) have been built by adding a conductive material to a large surface area material such as activated carbon to improve the conductivity of the electrode, and using a binder to support the mixture on a current collector such as aluminum foil.

In this case, a separator lies between the positive and negative electrodes. The electrodes and the separator are generally impregnated with an electrolyte solution.

However, in such prior-art electric double-layer capacitors, adhesion and tackiness between the pair of electrodes and the electrolyte (separator) is low. This has an especially large impact in film-type electric double-layer capacitors.

That is, film-type electric double-layer capacitors, as noted above, have a positive electrode/electrolyte (separator)/negative electrode construction. Unlike cylindrical capacitors in which the positive electrode/electrolyte (separator)/negative electrode composite is coiled and placed in a case, the absence of a coiling pressure in film-type capacitors means that pressure is not applied between the positive electrode and the electrolyte and between the electrolyte and the negative electrode, allowing the electrolyte to separate readily from the positive and negative electrodes. Thus, the electrolyte (separator) placed between the positive electrode and the negative electrode, in addition to serving as an electrolyte, must also have the ability to strongly bond the positive and negative electrodes. In other words, it must have adhesion and tackiness.

Examples of binders used in electric double-layer capacitors to support a slurry of a large surface area material such as activated carbon on a metal current collector include polytetrafluoroethylene, polyvinylidene fluoride, polyvinyl pyrrolidone and carboxymethylcellulose. Of these, polyvinylidene fluoride has excellent film-formability.

However, none of these binders has the ability to dissolve ion-conductive salts to a high concentration or possesses itself a high ionic conductivity. Moreover, these binders are unable to simultaneously satisfy the requirements for strong adhesion to the current collector, low dc resistance, and large electrostatic capacitance.

In addition, to lower the interfacial resistance between the electrodes and the electrolyte (separator), it is desirable for the same polymer used in the electrolyte to serve also as the binder resin in the electrodes.

Such an electrode binder must retain the ability to bond large surface area materials such as activated carbon; that is, it must have tackiness and adhesion.

The binder resins and solid polymer electrolytes for electric double-layer capacitors that have hitherto been reported in the literature are all lacking in sufficient tackiness and adhesion, as well as other important properties. Hence, a need has been felt for further improvement.

DISCLOSURE OF THE INVENTION

The present invention was conceived in light of the above circumstances. A first object of the invention is to provide electrolyte compositions and solid polymer electrolytes for electric double-layer capacitors, which compositions and electrolytes are endowed with high ionic conductivity, high tackiness and shape retention. Another object of the invention is to provide polarizable electrode-forming compositions and polarizable electrodes having a high adhesion, god dielectric properties, and shape retention. A further object of the invention is to provide high-performance electric double-layer capacitors which can be arrived at us ng these compositions and components.

The inventors have conducted extensive and repeated investigations in order to achieve these aims. As a result, they have discovered that an effective way to raise the ionic conductivity within an electrolyte composition for electric double-layer capacitors composed primarily of a polymeric compound having oxyalkylene chain-bearing polyvinyl alcohol units and an ion-conductive salt is to increase the proportion per unit weight of polymeric compound in which polyoxyalkylene segments capable of dissolving an ion-conductive salt are introduced onto the polymer.

That is, a typical example in which polyoxyalkylene branched chains are introduced onto a conventional natural polymeric substance such as cellulose might involve the introduction of a 10-mole unit length polyoxyethylene group per cellulose unit. In this case, the molecular weight of the cellulose recurring units ($C_6H_{10}O_5$) is 162 and the molecular weight of the 10-mole polyoxyethylene groups (($CH_2CH_2O$)$_{10}$—H) is 441. Hence, the fraction represented by the polyoxyethylene groups, which are the portions of the polymer that dissolve the ion-conductive salt, relative to the unit weight of the resulting cellulose derivative (polyoxyethylene fraction) is given by the ratio 441/(441+161)=0.733.

By contrast, if a polymeric compound such as polyvinyl alcohol (PVA) having a unit molecular weight lower than natural polymeric substances such as cellulose is used as the backbone, given that the molecular weight of the PVA recurring units ($CH_2CH(OH)$) is 44 and the molecular weight of the 10-mole polyoxyethylene groups (($CH_2CH_2O$)$_{10}$—H) is 441, a higher polyoxyethylene fraction of 441/(441+44)=0.909 is achieved. The higher polyoxyethylene fraction enables a greater amount of ion-conductive salt to be dissolved, in addition to which the molecule has a larger number of polyoxyethylene segments where ion migration occurs, increasing ion mobility. The inventors have found that a high ionic conductivity can be attained in this way.

Also, when a film-type electric double-layer capacitor is assembled so as to include a solid polymer electrolyte (separator), for the solid polymer electrolyte to additionally serve as the binder component in the electric double-layer capacitor, it must have both a high ionic conductivity, and the ability to bind powdery battery active materials. That is, it must be tacky. Moreover, film-type electric double-layer capacitors made with solid polymer electrolytes generally have a polarizable electrode/solid electrolyte (separator)/polarizable electrode construction. Unlike cylindrical capacitors in which this polarizable electrode/solid electrolyte (separator)/polarizable electrode composite is coiled and placed in a case, the absence of a coiling pressure in film-type electric double-layer capacitors means that pressure is not applied between each of the polarizable electrodes and the solid electrolyte, allowing the solid electrolyte (separator) to separate readily from the pair of polarizable electrodes. For this reason as well, the separator disposed between the pair of polarizable electrodes, in addition to serving as an electrolyte, must also have the ability to strongly bond the polarizable electrodes. In other words, it must have tackiness and adhesion.

Pursuing their investigations even further based on these findings, the inventors have additionally found that electrolyte compositions for electric double-layer capacitors comprising (A) a polymeric compound containing polyvinyl alcohol units of general formula (1) below and having an average degree of polymerization of at least 20, in which compound some or all of the hydroxyl groups on the polyvinyl alcohol units are substituted with oxyalkylene-containing groups to an average molar substitution of at least 0.3, and (B) an ion-conductive salt, as well as electrolyte compositions for electric double-layer capacitors comprising (A) the above polymeric compound, (B) an ion-conductive salt and (C) a compound bearing crosslinkable functional groups have the ability to dissolve a large amount of ion-conductive salt because of their high oxyalkylene fraction. Moreover, the presence in the polymeric compound molecule of a larger number of oxyalkylene segments over which the ions can migrate increases ion mobility, enabling a high ionic conductivity to be achieved. These electrolyte compositions also have a high tackiness which allows them to function as an excellent binder component capable of firmly bonding large surface area materials and conductive materials. The inventors have also discovered that solid polymer electrolytes which have a semi-interpenetrating polymer network structure wherein molecular chains on the polymeric compound (A) are intertwined with the three-dimensional network structure of a polymer obtained by crosslinking the above compound (C) having crosslinkable functional groups and which contain also the above ion-conductive salt (B) have a dramatically improved shape retention. Because the matrix is amorphous rather than crystalline, such solid polymer electrolytes have a high ionic conductivity and a high tackiness, making them ideal for use in electric double-layer capacitors. The inventors have found as well that electric double-layer capacitors arrived at using these compositions and components have an outstanding performance.

Accordingly, a first aspect of the present invention provides an electrolyte composition for electric double-layer capacitors, characterized by primarily comprising (A) a polymeric compound containing polyvinyl alcohol units of general formula (1):

and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

A second aspect of the invention provides an electrolyte composition for electric double-layer capacitors, characterized by primarily comprising (A) a polymeric compound containing polyvinyl alcohol units of above general formula (1) and having an average degree of polymerization of at least 20, in which compound some or all of the hydroxyl groups on the polyvinyl alcohol units are substituted with oxyalkylene-containing groups to an average molar substitution of at least 0.3; (B) an ion-conductive salt; and (C) a compound having crosslinkable functional groups.

A third aspect of the invention provides a solid polymer electrolyte for electric double-layer capacitors, characterized by having a semi-interpenetrating polymer network structure wherein molecular chains on the polymeric compound serving as above component A are intertwined with the three-dimensional network structure of a polymer obtained by crosslinking the compound serving as above component C, and containing the ion-conductive salt serving as above component B.

A fourth aspect of the invention provides a polarizable electrode-forming composition for electric double-layer capacitors, characterized by primarily comprising (A) a polymeric compound containing polyvinyl alcohol units of above general formula (1) and having an average degree of polymerization of at least 20, in which compound some or all of the hydroxyl groups on the polyvinyl alcohol units are substituted with oxyalkylene-containing groups to an average molar substitution of at least 0.3; (D) a large surface area material; and (E) a conductive material.

A fifth aspect of the invention provides a polarizable electrode-forming composition for electric double-layer capacitors, characterized by primarily comprising (A) a polymeric compound containing polyvinyl alcohol units of above general formula (1) and having an average degree of polymerization of at least 20, in which compound some or all of the hydroxyl groups on the polyvinyl alcohol units are substituted with oxyalkylene-containing groups to an average molar substitution of at least 0.3; (C) a compound having crosslinkable functional groups; (D) a large surface area material; and (E) a conductive material.

A sixth aspect of the invention provides a polarizable electrode produced by coating the polarizable electrode-forming composition according to the above fourth or fifth aspect of the invention onto a current collector.

A seventh aspect of the invention provides an electric double-layer capacitor comprising a pair of polarizable electrodes with a separator disposed therebetween, characterized in that the above-described electrodes are used as the pair of polarizable electrodes and the separator is composed of a separator substrate impregnated with an ion-conductive salt-containing solution.

An eighth aspect of the invention provides an electric double-layer capacitor comprising a pair of polarizable electrodes with a separator disposed therebetween, characterized in that the above-described electrodes are used as the pair of polarizable electrodes and the separator is composed of a separator substrate coated or impregnated with the electrolyte composition for electric double-layer capacitors of the above first or second aspect of the invention.

A ninth aspect of the invention provides an electric double-layer capacitor comprising a pair of polarizable electrodes with a separator disposed therebetween, characterized in that the above-described electrodes are used as the pair of polarizable electrodes and the separator is a solid polymer electrolyte layer composed of the electrolyte composition for electric double-layer capacitors of the above first aspect of the invention.

A tenth aspect of the invention provides an electric double-layer capacitor comprising a pair of polarizable electrodes with a separator disposed therebetween, characterized in that the above-described electrodes are used as the pair of polarizable electrodes and the separator is a solid polymer electrolyte for electric double-layer capacitors according to the above third aspect of the invention.

BEST MODE FOR CARRYING OUT THE INVENTION

Figure 1:
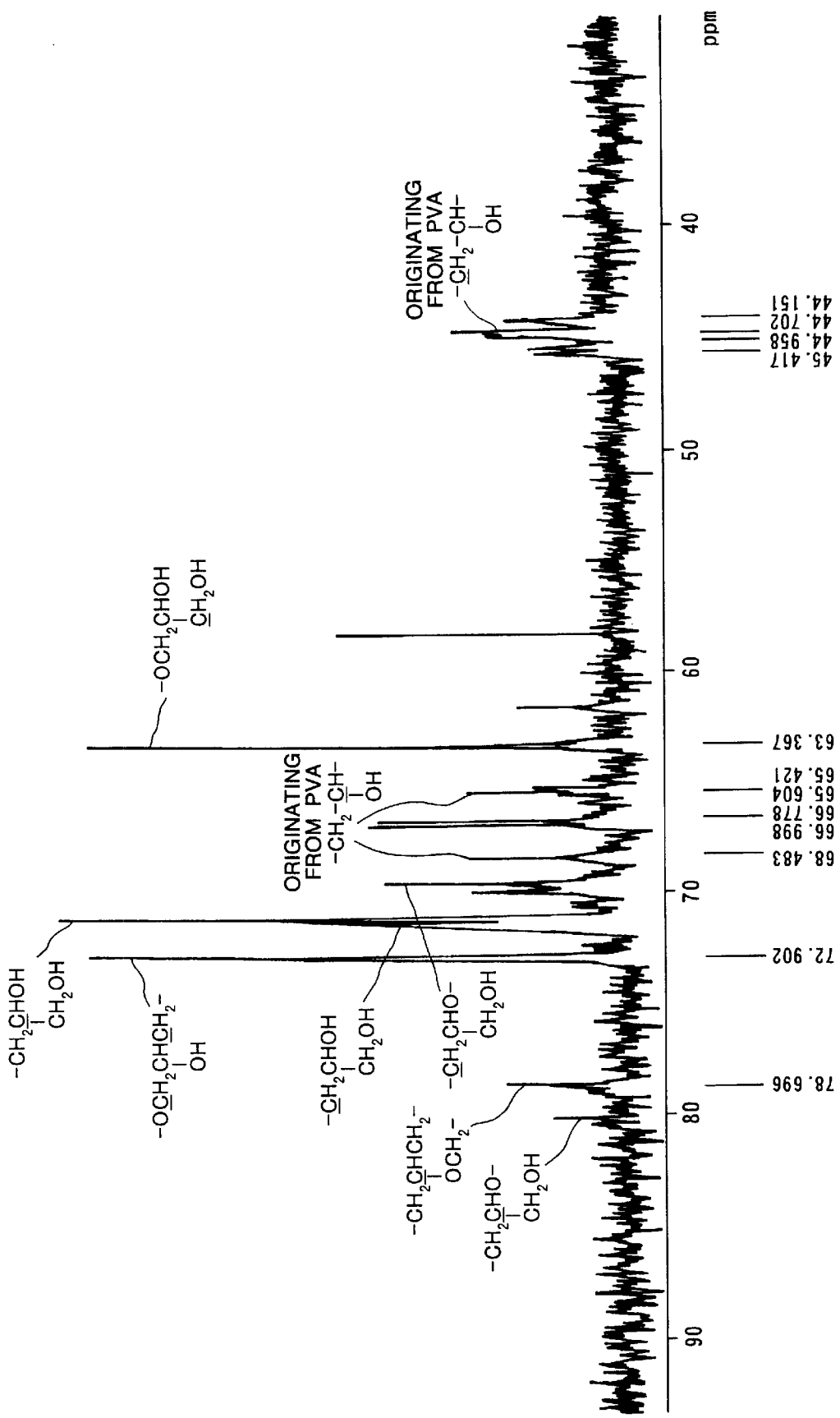
FIG. 1 is the $^{13}$C-NMR spectrum of the dihydroxypropylated polyvinyl alcohol prepared in Synthesis Example 1 of the invention.

The invention is described more fully below.

The electrolyte compositions for electric double-layer capacitors of the invention have the following first or second set of constituent components.

The first electrolyte composition is composed primarily of (A) a polymeric compound having oxyalkylene chain-bearing polyvinyl alcohol units, and (B) an ion-conductive salt.

The second electrolyte composition is composed primarily of (A) a polymeric compound having oxyalkylene chain-bearing polyvinyl alcohol units, (B) an ion-conductive salt, and (C) a compound having crosslinkable functional groups.

The first electrolyte composition for electric double-layer capacitors of the invention is described.

The polymeric compound serving as component A contains polyvinyl alcohol units and has an average degree of polymerization of at least 20, preferably at least 30, and most preferably at least 50. Some or all of the hydroxyl groups on the polyvinyl alcohol units are substituted with oxyalkylene-containing groups. The upper limit in the average degree of polymerization is preferably no higher than 2,000, and especially no higher than 200. The average degree of polymerization refers herein to the number-average degree of polymerization. Polymeric compounds with too high a degree of polymerization have an excessively high viscosity, making them difficult to handle. Accordingly, the range in the degree of polymerization is preferably from 20 to 500 monomeric units.

The above polyvinyl alcohol units make up the backbone of the polymeric compound and have the following general formula (1).

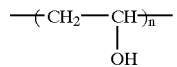

In formula (1), the letter n is at least 20, preferably at least 30, and most preferably at least 50. The upper limit for n is preferably no higher than 2,000, and especially no higher than 200.

It is highly advantageous for the polyvinyl alcohol unit-containing polymeric compound serving as component A of the inventive composition to be a homopolymer which satisfies the above range in the average degree of polymerization and in which the fraction of polyvinyl alcohol units in the molecule is at least 98 mol %. However, use can also be made of, without particular limitation, polyvinyl alcohol unit-containing polymeric compounds which satisfy the above range in the average degree of polymerization and have a polyvinyl alcohol fraction of preferably at least 60 mol %, and more preferably at least 70 mol %. Illustrative examples include polyvinylformal in which some of the hydroxyl groups on the polyvinyl alcohol have been converted to formal, modified polyvinyl alcohols in which some of the hydroxyl groups on the polyvinyl alcohol have been alkylated, poly(ethylene vinyl alcohol), partially saponified polyvinyl acetate, and other modified polyvinyl alcohols.

Some or all of the hydroxyl groups on the polyvinyl alcohol units of the polymeric compound serving as component C are substituted with oxyalkylene-containing groups (moreover, some of the hydrogen atoms on these oxyalkylene groups may be substituted with hydroxyl groups) to an average molar substitution of at least 0.3. The proportion of hydroxyl groups substituted with oxyalkylene-containing groups is preferably at least 30 mol %, and more preferably at least 50 mol %.

The average molar substitution (MS) can be determined by accurately measuring the weight of the polyvinyl alcohol charged and the weight of the reaction product. Let us consider, for example, a case in which 10 g of PVA is reacted with ethylene oxide, and the weight of the resulting PVA derivative is 15 g. The PVA units have the formula —(CH$_2$CH(OH))—, and so their unit molecular weight is 44. In the PVA derivative obtained as the reaction product, the —OH groups on the original —(CH$_2$CH(OH))— units have become —O—(CH$_2$CH$_2$O)$_n$— groups, and so the unit molecular weight of the reaction product is 44+44n. Because the increase in weight associated with the reaction is represented by 44n, the calculation is carried out as follows.

PVA/PVA derivative=44/(44+44n)=10 g/15 g

440+440n=660 n=0.5

Hence, the molar substitution in this example is 0.5. Of course, this value merely represents the average molar substitution. That is, values such as the quantity of unreacted PVA units on the molecule and the length of the oxyethylene groups introduced by the reaction cannot be specified in this way.

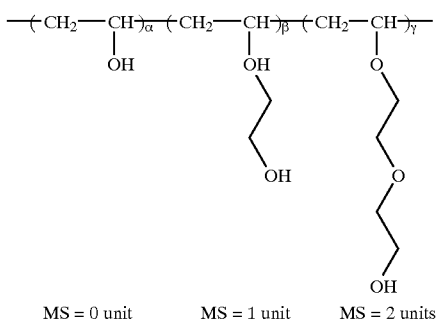

MS = 0 unit     MS = 1 unit     MS = 2 units

Average MS = (0 + 1 + 2) / 3 = 1

Examples of suitable methods for introducing oxyalkylene-containing groups onto the above polyvinyl alcohol unit-containing polymeric compound include (1) reacting the polyvinyl alcohol unit-containing polymeric compound with an oxirane compound such as ethylene oxide, and (2) reacting the polyvinyl alcohol unit-containing polymeric compound with a polyoxyalkylene compound having a hydroxy-reactive substituent at the end.

In above method (1), the oxirane compound may be any one or combination selected from among ethylene oxide, propylene oxide and glycidol.

If ethylene oxide is reacted in this case, one or more oxyethylene chain is introduced onto the polymeric compound as shown in the following formula.

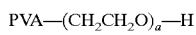

PVA—(CH$_2$CH$_2$O)$_a$—H

In the formula, the letter a is preferably from 1 to 10, and most preferably from 1 to 5.

If propylene oxide is reacted instead, one or more oxypropylene chain is introduced onto the polymeric compound as shown below.

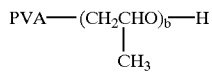

In the formula, the letter b is preferably from 1 to 10, and most preferably from 1 to 5.

And if glycidol is reacted, two branched chains (1) and (2) are introduced onto the compound, as shown below.

Reaction of a hydroxyl group on the PVA with glycidol can proceed in either of two ways: a attack or b attack. The reaction of one glycidol molecule creates two new hydroxyl groups, each of which can in turn react with glycidol. As a result, the two following branched chains (1) and (2) are introduced onto the hydroxyl groups of the PVA units.

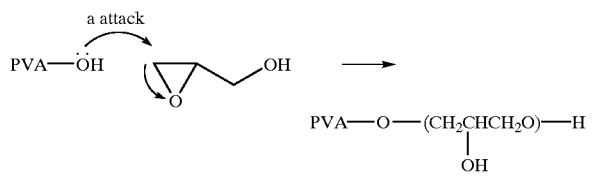

a attack

PVA—OH ... OH →

PVA—O—(CH$_2$CHCH$_2$O)—H
                |
               OH

-continued

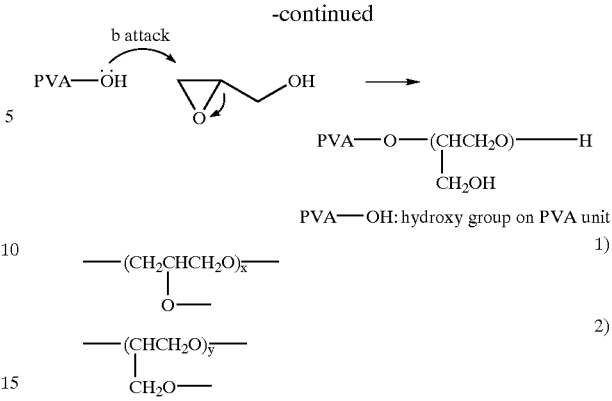

b attack

PVA—OH ... OH →

PVA—O—(CHCH$_2$O)———H
          |
          CH$_2$OH

PVA—OH: hydroxy group on PVA unit

1)
—(CH$_2$CHCH$_2$O)$_{\overline{x}}$—
       |
       O—

2)
—(CHCH$_2$O)$_{\overline{y}}$—
   |
   CH$_2$O—

In branched chains (1) and (2), the value x+y is preferably from 1 to 10, and most preferably from 1 to 5. The ratio of x to y is not particularly specified, although x:y generally falls within a range of 0.4:0.6 to 0.6:0.4.

The reaction of the polyvinyl alcohol unit-containing polymeric compound with the above oxirane compound can be carried out using a basic catalyst such as sodium hydroxide, potassium hydroxide or any of various amine compounds.

The reaction of polyvinyl alcohol with glycidol is described below as an illustrative example. First, the reaction vessel is charged with a solvent and polyvinyl alcohol. It is not essential in this case for the polyvinyl alcohol to dissolve in the solvent. That is, the polyvinyl alcohol may be present in the solvent either in a uniformly dissolved state or in a suspended state. A given amount of a basic catalyst, such as aqueous sodium hydroxide, is added and stirred for a while into this solution, following which glycidol diluted with a solvent is added. Reaction is carried out at a given temperature for a given length of time, after which the polyvinyl alcohol is removed. If the polyvinyl alcohol is present within the reaction mixture in undissolved form, it is separated off by filtration using a glass filter, for example. If, on the other hand, the polyvinyl alcohol is dissolved within the reaction mixture, it is precipitated out of solution by pouring an alcohol or other suitable precipitating agent into the reaction mixture, following which the precipitate is separated off using a glass filter or the like. The modified polyvinyl alcohol product is purified by dissolution in water, neutralization, and either passage through an ion-exchange resin or dialysis. The purified product is then freeze-dried, giving a dihydroxypropylated polyvinyl alcohol.

In the reaction, the molar ratio between the polyvinyl alcohol and the oxirane compound is preferably 1:10, and most preferably 1:20.

The polyoxyalkylene compound having a hydroxy-reactive substituent at the end used in above method (2) may be a compound of general formula (2) below

A—(R$^2$O)$_m$—R$^3$     (2)

In formula (2), the letter A represents a monovalent substituent having reactivity with hydroxyl groups. Illustrative examples include isocyanate groups, epoxy groups, carboxyl groups, acid chloride groups, ester groups, amide groups, halogen atoms such as fluorine, bromine and chlorine, silicon-bearing reactive substituents, and other monovalent substituents capable of reacting with hydroxyl groups. Of these, isocyanate groups, epoxy groups, and acid chloride groups are preferred for their reactivity.

The carboxyl group may also be an acid anhydride. Preferred ester groups are methyl ester and ethyl ester groups. Examples of suitable silicon-bearing reactive substituents include substituents having terminal SiH or SiOH groups.

The hydroxy-reactive group, such as isocyanate or epoxy, may be bonded directly to the oxyalkylene group $R^2O$ or through, for example, an intervening oxygen atom, sulfur atom, carbonyl group, carbonyloxy group, nitrogenous group (e.g., NH—, $N(CH_3)$—, $N(C_2H_5)$—) or $SO_2$ group. Preferably, the hydroxy-reactive group is bonded to the oxyalkylene group $R^2O$ through an intervening group such as an alkylene, alkenylene or arylene group having 1 to 10 carbons, and especially 1 to 6 carbons.

Examples of polyoxyalkylene groups bearing this type of substituent A that may be used are the products obtained by reacting polyisocyanate compounds at the hydroxyl end group on a polyoxyalkylene group. Isocyanate group-bearing compounds that may be used in this case include compounds having two or more isocyanate groups on the molecule, such as tolylene diisocyanate, xylylene diisocyanate, naphthylene diisocyanate, diphenylmethane diisocyanate, biphenylene diisocyanate, diphenyl ether diisocyanate, tolidine diisocyanate, hexamethylene diisocyanate and isophorone diisocyanate. For example, use can be made of compounds such as may be obtained from the following reaction.

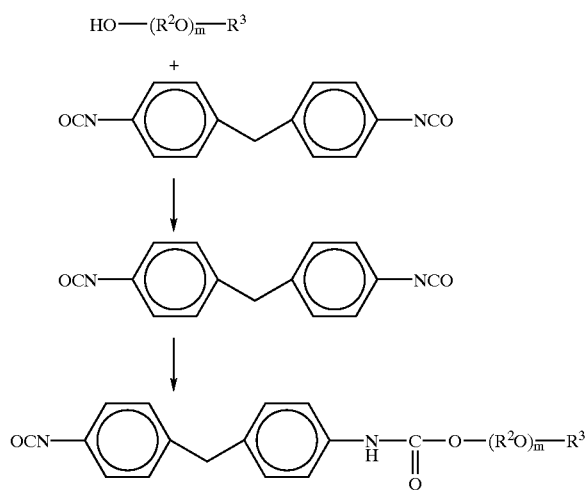

In the formula, $R^2O$ is an oxyalkylene group of 2 to 5 carbons, examples of which include —$CH_2CH_2O$—, —$CH_2CH_2CH_2O$—, —$CH_2CH(CH_3)O$—, —$CH_2CH(CH_2CH_3)O$— and —$CH_2CH_2CH_2O$—. The letter m represents the number of moles of the oxyalkylene group that are added. This number of added moles (m) is preferably from 1 to 100, and most preferably from 1 to 50.

Here, the polyoxyalkylene chain represented by the above formula $(R^2O)_m$ is most preferably a polyethylene glycol chain, a polypropylene glycol chain or a polyethylene oxide (EO)/polypropylene oxide (PO) copolymer chain. The weight-average molecular weight of these polyoxyalkylene chains is preferably from 100 to 3,000, and most preferably within the weight-average molecular weight range of 200 to 1,000 at which the compound is liquid at room temperature.

$R^3$ in the above formula is a capping moiety for one end of the chain. This represents a hydrogen atom, a substituted or unsubstituted monovalent hydrocarbon group having 1 to 10 carbons, or a $R^4CO$— group (wherein $R^4$ is a substituted or unsubstituted monovalent hydrocarbon group having 1 to 10 carbons).

Illustrative examples of the substituted or unsubstituted monovalent hydrocarbon groups having 1 to 10 carbons that may be used as the capping moiety include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl and xylyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted groups in which some or all of the hydrogen atoms on the above groups have been substituted with halogen atoms such as fluorine, bromine or chloride, cyano, hydroxyl, $H(OR^2)_z$— (wherein $R^2$ is an alkylene having 2 to 4 carbons, and z is an integer from 1 to 100), amino, aminoalkyl or phosphono. Specific examples of such substituted groups include cyanoethyl, cyanobenzyl, substituted groups in which cyano is bonded to other alkyl groups, chloromethyl, chloropropyl, bromoethyl and trifluoropropyl. These may be used alone or as combinations of two or more thereof. The monovalent hydrocarbon group is preferably one having from 1 to 8 carbons.

Illustrative examples of $R^4CO$— groups that may be used as the capping moiety include those in which $R^4$ is a substituted or unsubstituted monovalent hydrocarbon group. Preferred examples of $R^4$ include alkyl or phenyl groups which may be substituted with cyano, acyl groups, benzoyl groups and cyanobenzoyl groups.

The reaction in method (2) between the above-described polyvinyl alcohol unit-containing polymeric compound and the above-described polyoxyalkylene compound having a hydroxy-reactive substituent at the end may be carried out in the same manner as the reaction carried out with an oxirane compound in method (1).

In the reaction, the molar ratio between the polyvinyl alcohol and the polyoxyalkylene compound having a hydroxy-reactive substituent at the end is preferably from 1:1 to 1:20, and most preferably from 1:1 to 1:10.

The structure of the polymeric compound of the invention in which oxyalkylene-containing groups have been introduced onto polyvinyl alcohol units can be verified by $^{13}$C-NMR spectroscopy. For example, as shown in FIG. 1, the $^{13}$C-NMR spectrum (DEPT spectrum measured using a Varian VXR-300 NMR spectrometer, with $D_2O$ as the solvent) of dihydroxypropylated polyvinyl alcohol prepared by reacting polyvinyl alcohol with glycidol includes peaks for PVA and peaks for the dihydroxypropyl groups originating from the glycidol.

The extent to which the oxyalkylene chain-bearing polyvinyl alcohol unit-containing polymeric compound serving as component (A) in the invention contains oxyalkylene groups can be determined in this case using various analytical techniques such as NMR or elemental analysis, although a method of determination based on the weight of the polymer charged as a reactant and the increase in weight of the polymer formed by the reaction is simple and convenient. For example, the yield may be determined by precisely measuring both the weight of the polyvinyl alcohol unit-containing polymeric compound charged into the reaction and the weight of the oxyalkylene group-bearing polyvinyl alcohol unit-containing polymeric compound obtained from the reaction, then using this difference to calculate the quantity of oxyalkylene chains that have been introduced onto the molecule (referred to hereinafter as the "average molar substitution," or "MS").

The average molar substitution serves here as an indicator of the number of moles of oxyalkylene groups that have been introduced onto the molecule per vinyl alcohol unit. In the polymeric compound of the invention, the average molar substitution must be at least 0.3, and is preferably at least 0.5, more preferably at least 0.7 and most preferably at least 1.0. No particular upper limit is imposed on the average molar substitution, although a value not higher than 20 is preferred. Too low an average molar substitution may result in the inability of the ion-conductive salt to dissolve, lower ion mobility and lower ionic conductivity. On the other hand, increasing the average molar substitution beyond a certain level fails to yield any further change in the solubility or mobility of the ion-conductive salt and is thus pointless.

Depending on its average degree of polymerization, the oxyalkylene chain-bearing polyvinyl alcohol unit-containing polymeric compound used as component A varies in appearance at room temperature (20° C.) from a highly viscous molasses-like liquid to a rubbery solid. The higher the average degree of polymerization, the more it qualifies as a solid (albeit, a soft, paste-like solid) having a low fluidity at room temperature.

The polymeric compound serving as component A, regardless of its average degree of polymerization, is not a linear polymer, but rather an amorphous polymer due to the intertwining of its highly branched molecular chains.

The oxyalkylene chain-bearing polyvinyl alcohol unit-containing polymeric compound used as component A in the invention can be prepared as a capped hydroxyl-bearing polymer derivative by capping some or all of the hydroxyl groups on the molecule (these being the sum of the remaining hydroxyl groups from the polyvinyl alcohol units and the hydroxyl groups on the oxyalkylene-containing groups introduced onto the molecule), and preferably at least 10 mol %, with one or more monovalent substituents selected from among halogen atoms, substituted or unsubstituted monovalent hydrocarbon groups having 1 to 10 carbons, $R^1CO$— groups (wherein $R^1$ is a substituted or unsubstituted monovalent hydrocarbon group of 1 to 10 carbons), $R^1_3Si$— groups ($R^1$ being as defined above), amino groups, alkylamino groups and phosphorus-containing groups.

The purpose of capping the hydroxyl groups on the oxyalkylene chain-bearing polyvinyl alcohol unit-containing polymeric compound used in the invention with the above substituents is two-fold.

(1) In a polymer containing a high concentration of ion-conductive salt, dissociated cations and counter ions (anions) will readily recombine in a low-dielectric-constant polymer matrix, lowering the conductivity. Because raising the polarity of the polymer matrix discourages ion association, one aim is to increase the dielectric constant of the matrix polymer by introducing polar groups at the hydroxyl groups on the oxyalkylene chain-bearing polyvinyl alcohol unit-containing polymeric compound.

(2) The second aim is to impart the polymeric compound with highly desirable characteristics, such as hydrophobic properties and fire retardance.

To increase the dielectric constant of the polymeric compound according to the first of these aims, the oxyalkylene chain-bearing polyvinyl alcohol unit-containing polymeric compound is reacted with a hydroxy-reactive compound so as to cap the hydroxyl end groups on the polymeric compound with highly polar substituents.

Although the highly polar substituents used for this purpose are not subject to any particular limitation, neutral substituents such as substituted or unsubstituted monovalent hydrocarbon groups having 1 to 10 carbons or $R^1CO$— groups (wherein $R^1$ is as defined above) are preferable to ionic substituents. If necessary, capping may also be carried out with other suitable substituents, such as amino groups and alkylamino groups.

The second purpose of capping mentioned above, which is to confer hydrophobic properties and fire retardance to the polymeric compound, can be achieved by the use of, for example, halogen atoms, $R^1_3Si$— groups ($R^1$ being as defined above) or phosphorus-containing groups to cap the hydroxyl groups on the polymeric compound.

Examples of halogen atoms that may be used as the substituent here include fluorine, bromine and chlorine. Examples of the substituted or unsubstituted monovalent hydrocarbon groups having 1 to 10 carbons, and preferably 1 to 8 carbons, that may be used as the substituent include the same as those mentioned above. Suitable examples of the $R^1$ moiety include the examples given above for $R^4$.

Examples of suitable $R^1_3Si$— groups include those in which $R^1$ represents the same substituted or unsubstituted monovalent hydrocarbon groups having 1 to 10 carbons, and preferably 1 to 6 carbons, as above. $R^1$ most preferably stands for an alkyl group. Of these, trialkylsilyl groups, and especially trimethylsilyl groups, are preferred.

Additional examples of suitable substituents include amino groups, alkylamino groups and phosphorus-containing groups.

The proportion of end groups capped with the above substituents is preferably at least 10 mol %, more preferably at least 50 mol %, and most preferably at least 90 mol %. It is even possible to cap substantially all the end groups with the above substituents, representing a capping ratio of essentially 100 mol %.

However, because there are cases in which the ability of the polymer to dissolve the ion-conductive salt decreases when all the hydroxyl end groups on the molecular chains of the polymer are capped with halogen atoms, $R^1_3Si$— groups or phosphorus-containing groups, it is essential to introduce a suitable amount of substituent while taking into account the solvating ability of the polymer. This amount, based on the total number of hydroxyl end groups, is preferably 10 to 95 mol %, more preferably 50 to 95 mol %, and most preferably 50 to 90 mol %.

The substituent used in the practice of the invention is most preferably a cyanated monovalent hydrocarbon group. Illustrative examples include cyanoethyl, cyanobenzyl, cyanobenzoyl, and substituents consisting of other cyanated alkyl groups.

The use of a cyanated monovalent hydrocarbon group such as cyanoethyl in combination with a $R^1_3Si$— group such as trimethylsilyl is highly advantageous. In this case, the two components are used in relative proportions of preferably 70 to 97 mol %, and especially 90 to 97 mol %, of the cyanated monovalent hydrocarbon groups, and preferably 3 to 30 mol %, and especially 3 to 10 mol %, of the $R^1_3Si$— groups, based on all the hydroxyl end groups on the molecular chains. Polymer derivatives in which cyanated monovalent hydrocarbon groups and $R^1_3Si$— groups have been incorporated together in this way possess excellent electrical conductivity and hydrophobic properties.

If cyanoethyl groups are introduced as the substituent, the method for capping the molecular chains of the oxyalkylene chain-bearing polyvinyl alcohol unit-containing polymeric compound may comprise mixing the oxyalkylene chain-bearing polyvinyl alcohol unit-containing polymeric compound with dioxane and acrylonitrile, adding a sodium hydroxide solution to the mixture, and stirring to effect the reaction. This yields a cyanoethylated polymer derivative in which cyanoethyl groups have been introduced onto some or all of the side chains.

In cases where acetyl groups are introduced as the substituent, this may be carried out by, for example, mixing the oxyalkylene chain-bearing polyvinyl alcohol unit-containing polymeric compound with acetic acid and methylene chloride, adding aqueous perchloric acid and acetic anhydride to the mixture, then reacting at room temperature under stirring. The reaction mixture is subsequently added to cold water, following which the precipitate that settles out is collected. The precipitate is dissolved in acetone, then poured once again into water. The resulting mixture is neutralized by adding sodium hydrogen carbonate, and the precipitate that forms is collected by filtration, placed together with water in dialysis tubing and dialyzed with ion-exchanged water. The resulting precipitate is collected, rinsed with water, then dried in vacuo, giving an acetylated polymer derivative.

Cyanobenzoyl groups may be introduced as the substituent by a method which involves, for example, mixing the oxyalkylene chain-bearing polyvinyl alcohol unit-containing polymeric compound with dioxane, adding pyridine, then adding dropwise a solution of cyanobenzoyl chloride in dioxane. The solution is then reacted at a given temperature, after which the reaction mixture is poured into a methanol/water (3:4) solution. The precipitate that settles out of solution is collected and dissolved in N,N-dimethylsulfoxide, following which the solution is placed in dialysis tubing and dialyzed. The resulting precipitate is collected, rinsed with water, then dried in vacuo, giving a cyanobenzoylated polymer derivative.

The introduction of trimethylsilyl groups may be carried out by dissolving the oxyalkylene chain-bearing polyvinyl alcohol unit-containing polymeric compound in dimethylacetamide, adding bis(trimethylsilyl)acetamide to the solution, and stirring at room temperature to effect the reaction. The reaction mixture is then cooled in an ice-water bath, and poured into a cold methanol/water (4:1) solution. The precipitate that settles out is collected by filtration then dissolved in acetamide, and the resulting solution is passed through filter paper. The solution is then dried in vacuo, yielding a trimethylsilylated polymer derivative.

Capping with other suitable substituents may likewise be carried out using known techniques for introducing those substituents onto hydroxyl end groups.

The oxyalkylene chain-bearing polyvinyl alcohol unit-containing polymeric compound or polymer derivative thereof in which some or all of the hydroxyl groups on the molecule have been capped and which has been obtained as described above (component A, binder resin) is conferred with ionic conductivity by the addition thereto of an ion-conductive salt (component B).

Any ion-conductive salt employed in ordinary electrochemical devices may be used without particular limitation. Preferred examples include salts obtained by combining a quaternary onium cation of the general formula $R^1R^2R^3R^4N^+$ or $R^1R^2R^3R^4P^+$ (wherein $R^1$ to $R^4$ are each independently alkyls of 1 to 10 carbons) with an anion such as $BF_4^+$, $N(CF_3SO_2)_2^-$, $PF_6^-$ or $ClO_4^-$.

Illustrative examples include $(C_2H_5)_4PBF_4$, $(C_3H_7)_4PBF_4$, $(C_4H_9)_4PBF_4$, $(C_6H_{13})_4PBF_4$, $(C_4H_9)_3CH_3PBF_4$, $(C_2H_5)_3(Ph-CH_2)PBF_4$ (wherein Ph stands for phenyl), $(C_2H_5)_4PPF_6$, $(C_2H_5)PCF_3SO_2$, $(C_2H_5)_4NBF_4$, $(C_4H_9)_4NBF_4$, $(C_6H_{13})_4NBF_4$, $(C_2H_5)_6NPF_6$, $LiBF_4$ and $LiCF_3SO_3$. These may be used alone or as combinations of two or more thereof.

The amount of the ion-conductive salt incorporated as component B in the composition varies empirically according to a number of factors, including the type of ion-conductive salt used, the molecular weight of the polymeric compound, and the type of capping substituent. In general, the amount of ion-conductive salt included per 100 parts by weight of the polymeric compound serving as component A is preferably to 1,000 parts by weight, more preferably 10 to 500 parts by weight, even more preferably 10 to 100 parts by weight, and most preferably 10 to 50 parts by weight. Too little ion-conductive salt results in a weak concentration of the ion conductor, making the conductivity too low for practical purposes. On the other hand, the capacity of the polymer matrix to dissolve the ion-conductive salt is exceeded if too much salt is used, resulting in salt deposition.

In addition to components A and B, the first electrolyte composition for electric double-layer capacitors according to the invention may also have added thereto a solvent capable of dissolving the ion-conductive salt. Illustrative examples of such solvents include chain ethers, such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and other solvents commonly used in electrochemical devices, such as amide solvents (e.g., N-methylformamide, N,N-dimethylformamide, N-methylacetamide and N-methylpyrrolidinone), carbonate solvents (e.g., diethyl carbonate, dimethyl carbonate, ethyl methyl carbonate, propylene carbonate, ethylene carbonate and styrene carbonate), and imidazolidinone solvents (e.g., 1,3-dimethyl-2-imidazolidinone). These solvents may be used singly or as mixtures of two or more thereof.

The first electrolyte composition for electric double-layer capacitors of the invention varies in appearance at room temperature (20° C.) from a highly viscous molasses-like liquid to a rubbery solid. The higher the average degree of polymerization, the more it qualifies as a solid (albeit, a soft, paste-like solid) having a low fluidity at room temperature.

In the first electrolyte composition for electric double-layer capacitors of the invention, the ion-conductive salt completely dissociates in the polymeric compound. Moreover, according to conductivity measurements by the ac impedance method, when the composition contains about 9 to 15 parts by weight of the ion conductive salt (component B) per 100 parts by weight of the polymeric compound (component A), it exhibits a high ionic conductivity of about $10^{-3}$ to $10^{-4}$ S/cm.

The first electrolyte composition for electric double-layer capacitors of the invention has a bond strength, as measured according to the peel-type bond strength test standard for adhesives set forth in JIS K6854 (1994), of preferably at least 0.1 kN/m, more preferably at least 0.2 kN/m, even more preferably at least 0.4 kN/m, and most preferably at least 0.6 kN/m.

Thus, the first electrolyte composition of the invention, even when an ion-conductive salt is added thereto in high concentration, remains amorphous without crystallizing. Moreover, because it has a high polyoxyalkylene fraction, metallic ions are able to move unimpeded through the molecule. These features, together with its high bond strength, make this inventive composition particularly well suited for use as an electrolyte and a binder polymer for electric double-layer capacitors.

The use of a polymeric compound having a low average degree of polymerization in the first electrolyte composition of the invention gives a liquid polymer electrolyte, whereas the use of a polymeric compound having a sufficiently high average degree of polymerization gives a solid polymer electrolyte. In either case, the polymer electrolyte has a high ionic conductivity and a high tackiness. Even as a solid, because the polymer electrolyte is a rubbery solid which readily undergoes plastic deformation, it deforms easily under stress and can thus be easily formed into a film or sheet.

The second electrolyte composition for electric double-layer capacitors of the invention is composed primarily of (A) a polymeric compound having oxyalkylene chain-bearing polyvinyl alcohol units, (B) an ion-conductive salt; and (C) a compound having crosslinkable functional groups. In this case, the polymeric compound serving as component A, the ion-conductive salt serving as component B and solvents capable of dissolving the ion-conductive salt that are used in the second electrolyte composition of the invention may be the same as component A, component B and the solvents described above in connection with the first electrolyte composition for electric double-layer capacitors.

The compound having crosslinkable functional groups serving as component C is added to impart physical strength for shape retention and other reasons. This compound is reacted to form a three-dimensional network structure, thereby enhancing the adhesive properties for use as a binder polymer and increasing shape retention.

In other words, when a mixture of (A) the polymeric compound (binder resin) and (B) the ion-conductive salt has added thereto (C) a crosslinkable functional group-bearing compound and the latter is reacted, it forms a three-dimensional network structure. The highly branched polymeric compound serving as component A intertwines within this three-dimensional network structure to form a firm, semi-interpenetrating polymer network (semi-IPN) structure. This structure enhances the compatibility between the different polymer chains and increases the bond strength between them, thus having the overall effect of dramatically increasing shape retention. Accordingly, by adding component C and having it intertwine with component A to form a semi-IPN structure, the bond strength and shape retention are enhanced, giving a material which is highly suitable for use as a solid polymer electrolyte and a binder polymer.

Any of the following may be used as the crosslinkable functional group-bearing compound serving as above component C:

(1) an epoxy group-bearing compound in combination with a compound having two or more active -hydrogens capable of reacting with the epoxy group;
(2) an isocyanate group-bearing compound in combination with a compound having two or more active hydrogens capable of reacting with the isocyanate group;
(3) a compound having two or more reactive double bonds.

Illustrative examples of the epoxy group-bearing compound (1) include compounds having two or more epoxy groups on the molecule, such as sorbitol polyglycidyl ether, sorbitan polyglycidyl ether, polyglycerol polyglycidyl ether, pentaerythritol polyglycidyl ether, diglycerol polyglycidyl ether, triglycidyl tris(2-hydroxyethyl) isocyanurate, glycerol polyglycidyl ether, trimethylpropane polyglycidyl ether, resorcinol diglycidyl ether, 1,6-hexanediol diglycidyl ether, ethylene glycol diglycidyl ether, propylene glycol diglycidyl ether, the diglycidyl ethers of ethylene-propylene glycol copolymers, polytetramethylene glycol diglycidyl ether and adipic acid diglycidyl ether.

A semi-IPN structure can be formed by reacting the epoxy group-bearing compound with a compound having at least two active hydrogens, such as an amine, alcohol, carboxylic acid or phenol. Illustrative examples include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene, p-xylylenediol, phenyl diethanolamine, methyl diethanolamine and polyethyleneimine, as well as polyfunctional amines and polyfunctional carboxylic acids.

Illustrative examples of the isocyanate group-bearing compound (2) include compounds having two or more isocyanate groups, such as tolylene diisocyanate, xylylene diisocyanate, naphthylene diisocyanate, diphenylmethane diisocyanate, biphenylene diisocyanate, diphenylether diisocyanate, tolidine diisocyanate, hexamethylene diisocyanate and isophorone diisocyanate.

Isocyanato-terminal polyols prepared by reacting the above isocyanate compounds with a polyol can also be used. Such compounds can be prepared by reacting an isocyanate such as diphenylmethane diisocyanate or tolylene diisocyanate with one of the polyols listed below.

In this case, the stoichiometric ratio between the isocyanate groups [NCO] on the isocyanate compound and the hydroxyl groups [OH] on the polyol compound is such as to satisfy the condition [NCO]>[OH]. The ratio [NCO]/[OH] is preferably in a range of 1.03/1 to 10/1, and especially 1.10/1 to 5/1.

Suitable examples of the polyol include polymeric polyols such as polyethylene glycol, polypropylene glycol and ethylene glycol-propylene glycol copolymers; and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis-(β-hydroxyethoxy)benzene, p-xylylenediol, phenyl diethanolamine, methyl diethanolamine and 3,9-bis(2-hydroxy-1,1-dimethyl)-2,4,8,10-tetraoxaspiro[5,5]-undecane.

Alternatively, instead of the polyol, an amine having two or more active hydrogens may be reacted with the isocyanate. The amine used may be one having a primary or a secondary amino group, although a primary amino group-bearing compound is preferred. Suitable examples include diamines such as ethylenediamine, 1,6-diaminohexane, 1,4-diaminobutane and piperazine; polyamines such as polyethyleneamine; and amino alcohols such as N-methyldiethanolamine and aminoethanol. Of these, diamines in which the functional groups have the same level of reactivity are especially preferred. Here again, the stoichiometric ratio between [NCO] groups on the isocyanate compound and [NH$_2$] and [NH] groups on the amine compound is such as to satisfy the conditions [NCO]>[NH$_2$]+[NH].

These isocyanate group-bearing compounds cannot by themselves form a semi-IPN structure. Such a structure can be formed by reacting an isocyanate group-bearing compound with a compound having at least two active hydrogens, such as an amine, alcohol, carboxylic acid or phenol. Illustrative examples include polymeric polyols such as polyethylene glycol, polypropylene glycol and ethylene glycol-propylene glycol copolymers, and also ethylene glycol, 1,2-propylene glycol, 1,3-propylene glycol, 1,3-butanediol, 1,4-butanediol, 1,5-pentanediol, 1,6-hexanediol, 2,2-dimethyl-1,3-propanediol, diethylene glycol, dipropylene glycol, 1,4-cyclohexanedimethanol, 1,4-bis(β-hydroxyethoxy)benzene, p-xylylenediol, phenyl diethanolamine, methyl diethanolamine and polyethyleneimine, as well as polyfunctional amines and polyfunctional carboxylic acids.

Illustrative examples of above reactive double bond-bearing compound (3) which may be used as the crosslinkable functional group-bearing compound serving as component C in the inventive composition include compounds containing two or more reactive double bonds, such as divinylbenzene, divinylsulfone, allyl methacrylate, ethylene glycol dimethacrylate, diethylene glycol dimethacrylate, triethylene glycol dimethacrylate, polyethylene glycol dimethacrylate (average molecular weight, 200 to 1,000), 1,3-butylene glycol dimethacrylate, 1,6-hexanediol dimethacrylate, neopentyl glycol dimethacrylate, polypropylene glycol dimethacrylate (average molecular weight, 400), 2-hydroxy-1,3-dimethacryloxypropane, 2,2-bis[4-(methacryloxyethoxy)phenyl]propane, 2,2-bis[4-(methacryloxyethoxy-diethoxy)phenyl]propane, 2,2-bis[4-(methacryloxyethoxy-polyethoxy)phenyl]propane, ethylene glycol diacrylate, diethylene glycol diacrylate, triethylene glycol diacrylate, polyethylene glycol diacrylate (average molecular weight, 200 to 1,000), 1,3-butylene glycol diacrylate, 1,6-hexanediol diacrylate, neopentyl glycol diacrylate, polypropylene glycol diacrylate (average molecular weight, 400), 2-hydroxy-1,3-diacryloxypropane, 2,2-bis[4-(acryloxyethoxy)phenyl]propane, 2,2-bis[4-(acryloxyethoxy-diethoxy)phenyl]propane, 2,2-bis[4-(acryloxyethoxy-polyethoxy)phenyl]propane, trimethylolpropane triacrylate, trimethylolpropane trimethacrylate, tetramethylolmethane triacrylate, tetramethylolmethane tetraacrylate, water-soluble urethane diacrylate, water-soluble urethane dimethacrylate, tricyclodecane dimethanol acrylate, hydrogenated dicyclopentadiene diacrylate, polyester diacrylate and polyester dimethacrylate.

If necessary, a compound containing an acrylic or methacrylic group may be added. Examples of such compounds include acrylates and methacrylates such as glycidyl methacrylate, glycidyl acrylate and tetrahydrofurfuryl methacrylate, as well as methacryloyl isocyanate, 2-hydroxymethylmethacrylic acid and N,N-dimethylaminoethylmethacrylic acid. Other reactive double bond-containing compounds may be added as well, such as acrylamides (e.g., N-methylolacrylamide, methylenebisacrylamide, diacetoneacrylamide), and vinyl compounds such as vinyloxazolines and vinylene carbonate.

Here too, in order to form a semi-IPN structure, a compound having at least two reactive double bonds must be added. That is, a semi-IPN network cannot be formed with only compounds such as methyl methacrylate that have but one reactive double bond. Some addition of a compound bearing at least two reactive double bonds is required.

Of the reactive double bond-bearing compounds described above, especially preferred reactive monomers include polyoxyalkylene component-bearing diesters of formula (3) below. The use of the latter in combination with a polyoxyalkylene component-bearing monoester of formula (4) below is recommended.

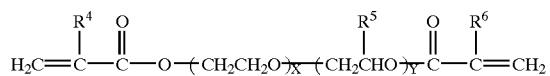

(3)

(4)

In formula (3), $R^4$, $R^5$ and $R^6$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and X and Y satisfy the condition $X \geq 1$ and $Y \geq 0$ or the condition $X \geq 0$ and $Y \geq 1$. The sum X+Y is preferably no higher than 100, and especially from 1 to 30. $R^4$, $R^5$ and $R^6$ are most preferably methyl, ethyl, n-propyl, i-propyl, n-butyl, i-butyl, s-butyl or t-butyl.

In formula (4), $R^7$, $R^8$ and $R^9$ are each independently a hydrogen atom or an alkyl group having 1 to 6 carbons, and preferably 1 to 4 carbons, such as methyl, ethyl, n-propyl, i-propyl, n-butyl, i-butyl, s-butyl and t-butyl; and A and B satisfy the condition $A \geq 1$ and $B \geq 0$ or the condition $A \geq 0$ and $B \geq 1$. The sum A+B is preferably no higher than 100, and especially from 1 to 30. $R^7$, $R^8$ and $R^9$ are most preferably methyl, ethyl, n-propyl, i-propyl, n-butyl, i-butyl, s-butyl or t-butyl.

Typically, a mixture of the polyoxyalkylene component-bearing diester and the polyoxyalkylene component-bearing monoester with the polymer derivative and the ion-conductive salt is heated or exposed to a suitable form of radiation, such as UV light, electron beams, x-rays, gamma rays, microwaves or high-frequency radiation, so as to form a semi-IPN type three-dimensional crosslinked network structure. The semi-IPN structure can be formed by adding only a polyoxyalkylene component-bearing diester to the polymeric compound serving as component A and carrying out polymerization. However, as already noted, the addition of a polyoxyalkylene component-bearing monoester, which is a monofunctional monomer, to the polyoxyalkylene component-bearing diester is generally preferred because such addition introduces polyoxyalkylene branched chains onto the three-dimensional network.

No particular limitation is imposed on the relative proportions of the polyoxyalkylene component-bearing diester and the polyoxyalkylene component-bearing monoester, although a weight ratio of polyoxyalkylene component-bearing diester to polyoxyalkylene component-bearing monoester within a range of 1 to 0.5, and especially 1 to 0.2, is preferred because this enhances film strength.

The amount of the crosslinkable functional group-bearing compound included as component C is preferably 10 to 500 parts by weight, more preferably 10 to 150 parts by weight, and most preferably 20 to 100 parts by weight, per 100 parts by weight of the polymeric compound serving as component A. The use of less than 10 parts by weight may fail to increase the film strength. On the other hand, the use of more than 500 parts by weight may result in a decline in the ability of the matrix as a whole to dissolve the ion-conductive metallic salt, leading to undesirable effects such as settling out of the salt and weakening of the formed film.

In addition to above components A, B and C, the second electrolyte composition for electric double-layer capacitors of the invention may include also an ordinary amount of the same types of solvents capable of dissolving the ion-conductive salt as were mentioned above in connection with the first electrolyte composition for electric double-layer capacitors of the invention.

In the practice of the invention, the composition comprising components A, B and C, in combination with other, optional, ingredients as needed, is heated or exposed to a suitable form of radiation, such as UV light, electron beams, x-rays, gamma rays, microwaves or high-frequency radiation so as to effect the reaction or polymerization of the crosslinkable functional group-bearing compound serving as component C. The resulting three-dimensional network structure mutually intertwines with molecular chains on the oxyalkylene branched chain-bearing polyvinyl alcohol unit-containing polymer compound to form a semi-interpenetrating polymer network structure, thereby giving a solid polymer electrolyte for electric double-layer capacitors according to the invention.

The semi-IPN structure can generally be formed using a radical polymerization reaction. The polymerization reaction may be carried out without the addition of a polymerization initiator (also referred to below as a "catalyst") when electron beam irradiation is used, although an initiator is ordinarily added in other cases.

No particular limitation is imposed on the polymerization initiator, or catalyst. Examples of photopolymerization initiators that may be used include acetophenone, trichloroacetophenone, 2-hydroxy-2-methylpropiophenone, 2-hydroxy-2-methylisopropiophenone, 1-hydroxycyclohexylketone, benzoin ether, 2,2-diethoxyacetophenone and benzyl dimethyl ketal.

Examples of thermal polymerization initiators that may be used include high-temperature initiators such as cumene hydroperoxide, t-butyl hydroperoxide, dicumyl peroxide and di-t-butylperoxide; conventional initiators such as benzoyl peroxide, lauroyl peroxide, persulfates and azobisisobutyronitrile; low-temperature initiators (redox initiators) such as hydrogen peroxide-ferrous salts, persulfate-acidic sodium sulfite, cumene hydroperoxide-ferrous salts and benzoyl peroxide-dimethylaniline; and also peroxide-organometallic alkyls, triethylboron, diethylzinc, and oxygen-organometallic alkyls.

These polymerization initiators may be used alone or as mixtures of two or more thereof. The initiator, or catalyst, for the radical polymerization reaction is added in an amount within a range of preferably 0.1 to 1 part by weight, and especially 0.1 to 0.5 part by weight, per 100 parts by weight of the crosslinkable functional group-bearing compound (component C). The addition of less than 0.1 part by weight results in a marked decline in the polymerization rate, whereas the addition of more than 1 part by weight does not further enhance the catalytic effects, and thus amounts merely to a wasteful use of reagent.

Although the polymerization reaction conditions are not subject to any particular limitations, in the case of photopolymerization, for example, reaction is typically carried out by 5 to 30 minutes of exposure to 1 to 50 mW/cm$^2$ of UV light at room temperature and in air.

Polymerization by means of e-beam irradiation is carried out at room temperature and an acceleration voltage of 150 to 300 kV. In the case of thermal polymerization, the reaction is effected by heating at 50 to 120° C. for a period of 0.5 to 6 hours.

The polymer formed by polymerization mutually intertwines with polymer chains on the oxyalkylene branched chain-bearing polyvinyl alcohol unit-containing polymeric compound to give a firm, three-dimensional semi-IPN structure. A crystal structure does not form, and so the matrix is amorphous.

Due to such considerations as the simplicity of the apparatus and running costs, the polymerization reaction is preferably carried out by UV irradiation or thermal polymerization.

The inventive second electrolyte composition for electrical double-layer capacitors and the solid polymer electrolyte obtained by curing this composition have a bond strength, as measured according to the peel-type bond strength test standard for adhesives set forth in JIS K6854 (1994), of preferably at least 0.1 kN/m, more preferably at least 0.2 kN/m, even more preferably at least 0.4 kN/m, and most preferably at least 0.6 kN/m.

The solid polymer electrolyte for electric double-layer capacitors of the invention has a firm semi-IPN structure wherein the highly branched oxyalkylene branched chain-bearing polyvinyl alcohol unit-containing polymeric compound is intertwined with the three-dimensional network structure. This greatly increases the shape retention of the polymer electrolyte, yet the molecular structure is that of an amorphous polymer and is not crystalline, allowing the ion conductor to move freely within the molecule. Moreover, the polymer electrolyte of the invention has a high conductivity of about $10^{-3}$ to $10^{-4}$ S/cm at room temperature, a high bond strength and tackiness, and is not subject to evaporation or leakage, thereby making it highly suitable for use as an electrolyte (separator) for electric double-layer capacitors.

The solid polymer electrolyte for electric double-layer capacitors of the invention may be processed by, for example, coating a liquid mixture of above components A to C and a suitable diluting agent onto a substrate, then subjecting component C to a crosslinking reaction so as to induce film formation. An electrolyte film of uniform thickness can be obtained by using a suitable means such as roller coating with an applicator roll, screen coating, doctor blade coating, spin coating or bar coating.

The polarizable electrode-forming compositions to which the invention is also directed have the following first and second sets of constituent components.

The first polarizable electrode-forming composition is composed primarily of (A) a polymeric compound having oxyalkylene chain-bearing polyvinyl alcohol units, (D) a large surface area material, and (E) a conductive material.

The second polarizable electrode-forming composition is composed primarily of (A) a polymeric compound having oxyalkylene chain-bearing polyvinyl alcohol units, (C) a compound having crosslinkable functional groups, (D) a large surface area material, and (E) a conductive material.

The polymeric compound used as component A of the first polarizable electrode-forming composition of the invention may be of the same type as the polymeric compound serving as component A of the above-described first and second electrolyte compositions for electric double-layer capacitors of the invention.

The large surface area material serving as component D is typically a carbon material having a specific surface of preferably at least 500 m$^2$/g, more preferably at least 1,000 m$^2$/g, and most preferably from 1,500 to 3,000 m$^2$/g, and having an average particle size of preferably not more than 30 µm, and especially from 5 to 30 µm. At a specific surface and an average particle size outside the above respective ranges, it may be difficult to achieve an electric double-layer capacitor having a large electrostatic capacitance and a low resistance.

Preferred examples of such large surface area materials include activated carbons manufactured from carbon materials by an appropriate treatment process such as steam activation or molten KOH activation. Exemplary activated carbons include those manufactured from coconut shells, phenols, petroleum coke or polyacenes. Such activated carbons may be used alone or as combinations of two or more thereof. Activated carbons derived from phenols, petroleum coke or polyacenes are preferred for achieving a large electrostatic capacitance.

The amount of the large surface area material included as component D is preferably from 800 to 2,300 parts by weight, and especially 1,300 to 2,000 parts by weight, per 100 parts by weight of the polymeric compound serving as component A. The addition of too much large surface area material may lower the bond strength of the polarizable electrode-forming composition, resulting in poor adhesion to the current collector. On the other hand, too little large surface area material may have the effect of increasing the resistance and lowering the capacitance of polarizable electrodes produced from the polarizable electrode-forming composition.

The conductive material used as component E may be any suitable material capable of conferring electrical conductivity to the polarizable electrode-forming composition. Illustrative examples include carbon black, Ketjenblack, acetylene black, carbon whiskers, natural graphite, artificial graphite, metallic fibers, and metallic powders such as titanium oxide and ruthenium oxide. Any one or combinations of two or more thereof may be used. Of these, Ketjenblack and acetylene black, which are both types of carbon black, are preferred. The average particle size of the conductive material powder is preferably 10 to 100 nm, and especially 20 to 40 nm.

The amount of conductive material serving as component E is preferably 50 to 500 parts by weight, and especially 100 to 300 parts by weight, per 100 parts by weight of the polymeric compound serving as component A. The presence of too much conductive material in the composition reduces the proportion of the large surface area material, which may lower the electrostatic capacitance of the polarizable electrode obtained from the composition. On the other hand, the addition of too little conductive material may fail to confer adequate conductivity.

In addition to above components A, D and E, the first polarizable electrode-forming composition of the invention may include also a diluting solvent. Illustrative examples of suitable diluting solvents include N-methyl-2-pyrrolidone, acetonitrile, tetrahydrofuran, acetone, methyl ethyl ketone, 1,4-dioxane and ethylene glycol dimethyl ether. Preferably, the diluting solvent is added in an amount of 80 to 150 parts by weight per 100 parts by weight of the overall polarizable electrode-forming composition.

The polymeric compound used as component A of the second polarizable electrode-forming composition of the invention may be of the same type as component A in the earlier-described first and second electrolyte compositions for electric double-layer capacitors of the invention. The compound having crosslinkable functional groups which is used herein as component C may be of the same type as component C in the earlier-described second electrolyte composition for electric double-layer capacitors. Moreover, the large surface area material serving as component D and the conductive material serving as component E may be of the same respective types as components D and E in the above-described first polarizable electrode material of the invention.

The compound having crosslinkable functional groups that serves as component C is included in an amount of 10 to 100 parts by weight, and preferably 20 to 80 parts by weight, per 100 parts by weight of the polymeric compound serving as component A. The large surface area material serving as component D and the conductive material serving as component E may be included in the same amounts as indicated above with reference to the first polarizable electrode-forming composition.

The first and second polarizable electrode-forming compositions of the invention have a bond strength, as determined by a method in accordance with JIS K6854 (1994), of preferably at least 0.1 kN/m, more preferably at least 0.2 kN/m, and most preferably at least 0.4 kN/m.

The invention relates also to polarizable electrodes which are produced by coating the above first and second polarizable electrode-forming compositions of the invention onto a current collector.

The current collector is preferably one made of metal. Aluminum and stainless steel are highly suitable as metal current collectors because of their high corrosion resistance. Aluminum is especially advantageous on account of its light weight and low electrical resistance.

The current collector may be in any suitable form, such as a foil, expanded metal, a sheet of sintered metal fiber or a sheet of foam metal. A foil-type collector having a thickness of 20 to 100 $\mu$m is especially advantageous because it is easy to roll or stack and relatively inexpensive. When a metal foil is employed as the current collector, it is desirable to use a chemical, electrochemical or physical means to roughen the surface because this improves the closeness of contact between the polarizable electrode and the metal collector and lowers resistance.

The polarizable electrode of the invention may be formed by applying the first or second polarizable electrode-forming composition onto the current collector to a uniform thickness using a suitable means such as roller coating with an applicator roll, screen coating, doctor blade coating, spin coating or bar coating.

In cases where the second polarizable electrode-forming composition is used, a polarizable electrode according to the invention can be obtained in a semisolid state by coating the composition onto the current collector, then holding the coated collector at 60 to 100° C. for 1 to 6 hours.

The invention is also directed at an electric double-layer capacitor comprised of a pair of polarizable electrodes with a separator disposed therebetween. The inventive polarizable electrodes described above are used as the pair of polarizable electrodes in the capacitor, with both electrodes in the pair preferably being of the same construction.

A first type of separator that may be used in the inventive capacitor is produced by impregnating a separator substrate with an ion-conductive salt-containing solution. The separator substrate may be a material commonly used as a separator substrate in electric double-layer capacitors. Illustrative examples include polyethylene nonwoven fabric, polypropylene nonwoven fabric, polyester nonwoven fabric, PTFE porous film, kraft paper, sheet laid from a blend of rayon fibers and sisal fibers, manila hemp sheet, glass fiber sheet, cellulose-based electrolytic paper, paper made from rayon fibers, paper made from a blend of cellulose and glass fibers, and combinations thereof in the form of multilayer sheets.

The ion-conductive salt-containing solution is composed of an ion-conductive salt and a solvent capable of dissolving the salt, which may be of the same type as the ion-conductive salt and the solvent thereof exemplified above in connection with the above-described first and second electrolyte compositions for electric double-layer capacitors of the invention. The ion-conductive salt has a concentration in the ion-conductive salt-containing solution of preferably 0.5 to 2.5 mol/L.

The separator produced by impregnating the separator substrate with this ion-conductive salt-containing solution may be placed between a pair of the inventive polarizable electrodes and a given force applied to form an electric double-layer capacitor.

A second type of separator that may be used herein is produced by coating or impregnating a separator substrate with the above-described first or second electrolyte composition for electric double-layer capacitors of the invention. The separator substrate used in this case may be any of those mentioned above.

Specifically, a separator produced by coating or impregnating the separator substrate with the first electrolyte composition for electric double-layer capacitors of the invention is placed between a pair of the inventive polarizable electrodes and a given pressure is applied to form an electric double-layer capacitor. Alternatively, a separator produced by coating or impregnating the separator substrate with the second electrolyte composition for electric double-layer capacitors of the invention is placed between a pair of the inventive polarizable electrodes and a given pressure is applied, following which the resulting assembly is held at 60 to 100° C. for 1 to 8 hours to effect curing, thereby forming an electric double-layered capacitor.

A third type of separator that may be used herein is composed of a solid polymer electrolyte layer obtained from the first electrolyte composition for electric double-layer capacitors of the invention. In this case, the polymeric compound serving as component A in the first electrolyte composition for electric double-layer capacitors of the invention is preferably used in a solid or semisolid form having a sufficiently large average degree of polymerization. That is, the average degree of polymerization must be at least 20, and is preferably within a range of 20 to 2000.

Specifically, the first electrolyte composition for electric double-layer capacitors of the invention is applied onto the surface of a polarizable electrode to a uniform thickness by a suitable means such as roller coating with an applicator roll, screen coating, doctor blade coating, spin coating or bar coating, and is cast using a doctor knife applicator. Next, another polarizable electrode of the same construction is placed against this cast side and a pressure is applied to the assembly such as to give the applied composition a predetermined thickness, thereby yielding an electric double-layer capacitor.

A fourth type of separator that may be used is composed of a solid polymer electrolyte layer produced by curing the second electrolyte composition for electric double-layer capacitors of the invention. In this case, the second electrolyte composition for electric double-layer capacitors of the invention is applied onto the surface of a polarizable electrode of the invention to a uniform thickness by a suitable means such as roller coating with an applicator roll, screen coating, doctor blade coating, spin coating or bar coating, and is cast using a doctor knife applicator. Next, another polarizable electrode of the same construction is placed against this cast side and a pressure is applied to the assembly such as to give the applied composition a predetermined thickness. The assembly is then held at 60 to 100° C. for 1 to 8 hours to effect curing, thereby yielding an electric double-layer capacitor.

Thus, the electric double-layer capacitors of the invention may have a variety of constructions depending on the particular combination of polarizable electrodes, separator and nonaqueous solvent used

TABLE 1

| | Polarizable electrodes | Separator | Nonaqueous solvent |
|---|---|---|---|
| (1) | Components A, D and E | Components A and B | not used |
| (2) | " | Components A, B and C | not used |
| (3) | " | Components A, B and C | used |

TABLE 1-continued

| | Polarizable electrodes | Separator | Nonaqueous solvent |
|---|---|---|---|
| (4) | Components A, C, D and E | Component B | used |
| (5) | " | Components A and B | not used |
| (6) | " | Components A, B and C | not used |
| (7) | " | Components A, B and C | used |

By using current collectors coated with the first or second polarizable electrode-forming composition as the pair of polarizable electrodes in the electric double-layer capacitors of the invention, it is possible to firmly bond a powdery large surface area material and conductive material. Moreover, by preferably using the first or second electrolyte composition for electric double-layer capacitors of the invention as the separator situated between the pair of polarizable electrodes, there can be obtained high-performance electric double-layer capacitors in which the polarizable electrodes and the separator are firmly bonded. In those cases in particular where the polarizable electrodes and the separator (electrolyte composition for electric double-layer capacitor, or solid polymer electrolyte) share the same constituents, the interfacial resistance between the polarizable electrodes and the separator can be lowered, making it possible to obtain high-quality electric double-layer capacitors having an outstanding performance.

No particular limitation is imposed on the shape of the electric double-layer capacitors of the invention, although film-like capacitors are preferred. One typical capacitor shape that may be used is a cylindrical shape arrived at by winding a continuous length of separator between a pair of continuous lengths of electrode to form an element, impregnating the element with a nonaqueous electrolyte solution, and enclosing the impregnated element in a cylindrical closed-end case. Another typical capacitor shape that may be used is a rectangular shape arrived at by alternately stacking a plurality of rectangular electrodes as the positive and negative electrodes with separators therebetween to form an element, impregnating the element with a nonaqueous electrolyte solution, and enclosing the impregnated element in a rectangular closed-end case.

The electric double-layer capacitors of the invention are well-suited to use in a variety of applications, including memory backup power supplies for electronic equipment such as personal computers and portable electronic devices, power supplies to protect personal computers and other equipment from sudden power outages, with solar cells as energy storage systems for solar power generation, and in combination with batteries as load-leveling power supplies.

The following synthesis examples, examples of the invention and comparative examples are provided to illustrate the invention, and are not intended to limit the scope thereof.

Synthesis Example 1

A reaction vessel equipped with a stirring element was charged with 10 parts by weight of polyvinyl alcohol (average degree of polymerization, 500; vinyl alcohol fraction, ≧98%) and 70 parts by weight of acetone. An aqueous solution of 1.81 parts by weight of sodium hydroxide in 2.5 parts by weight of water was gradually added under stirring, and stirring was continued for one hour at room temperature. To this solution was gradually added over a period of 3 hours a solution of 67 parts by weight of glycidol in 100 parts by weight of acetone. The resulting mixture was stirred for 8 hours at 50° C. to effect the reaction. Stirring was stopped following reaction completion, whereupon the polymer precipitated from the mixture. The precipitate was collected, dissolved in 400 parts by weight of water and neutralized with acetic acid. The neutralized polymer was purified by dialysis, and the resulting solution was freeze-dried, giving 22.50 parts by weight of a dihydroxypropylated polyvinyl alcohol.

The reaction product had the molecular structure shown below.

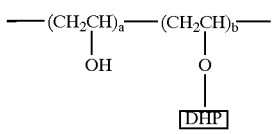

Here, DHP represents the dihydroxypropyl group which has formed as a result of glycidol addition. The structure is that of an oligomer chain having either of the two linkages shown below.

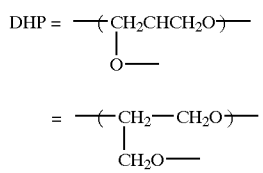

The molar substitution (MS) can be calculated as follows from the weight of the PVA charged and the weight of the product obtained.

(unit molecular weight of PVA)/(unit molecular weight of PVA derivative obtained by addition of $n$ units of glycidol)

$= 44/(44 + 74n)$ $= 10$ (weight of charged PVA)/22.50 (weight of product)

$n=0.74$

The average molar substitution calculated from the yield is thus 0.74.

FIG. 1 shows the $^{13}$C-NMR spectrum (DEPT spectrum measured using a Varian VXR-300 NMR spectrometer, with $D_2O$ as the solvent) of this product.

The average molar substitution determined from the C* carbon signal intensity (A) of the —C*H$_2$—C(OH)H— units from the unreacted PVA and the signal intensity (C) of the other carbons was 0.95.

In addition, the fraction of unreacted —(CH$_2$—C(OH)H)— units determined by comparing signal intensities (A) and (C) was 0.57.

Accordingly, in the above formula, a=0.57 and b 0.43.

Hence, the average length L of the DHP chain was L=MS/b=2.21.

Synthesis Example 2

A dihydroxypropylated polyvinyl alcohol was prepared by the same method as in Synthesis Example 1, except that 134 parts by weight of glycidol was used. The yield was 33.04 parts by weight. The average molar substitution by dihydroxypropyl units introduced onto the polyvinyl alcohol, as calculated from the yield, was 1.37. The molar substitution determined from the NMR spectrum was 1.49. The ratio a:b was 0.6:0.4, and L was 3.73.

Synthesis Example 3

A reaction vessel equipped with a stirring element was charged with 10 parts by weight of polyvinyl alcohol (average degree of polymerization, 500; vinyl alcohol fraction, ≧98%) and 150 parts by weight of dimethylsulfoxide. An aqueous solution of 1.81 parts by weight of sodium hydroxide in 2.5 parts by weight of water was gradually added under stirring, and stirring was continued for one hour at room temperature. To this solution was gradually added over a period of 3 hours a solution of 67 parts by weight of glycidol in 100 parts by weight of dimethylsulfoxide. The resulting mixture was stirred for 8 hours at 50° C. to effect the reaction. Following reaction completion, a uniform solution was obtained and so this was diluted with water and neutralized with acetic acid. The neutralized solution was purified by dialysis, and the resulting solution was freeze-dried, giving 30.01 parts by weight of a dihydroxypropylated polyvinyl alcohol. The average molar substitution by dihydroxypropyl units introduced onto the polyvinyl alcohol, as calculated from the yield, was 1.19. The molar substitution determined from the NMR spectrum was 1.23. The ratio a:b was 0.58:0.42, and L was 2.93.

Synthesis Example 4

A hydroxypropylated polyvinyl alcohol was prepared by the same method as in Synthesis Example 3, except that 53 parts by weight of propylene oxide was used instead of glycidol. The yield was 24.63 parts by weight, and the average molar substitution by the hydroxypropyl units introduced onto the polyvinyl alcohol, as calculated from the yield, was 1.11. The molar substitution can also be calculated as follows.

(unit molecular weight of $PVA$)/(unit molecular weight of $PVA$ derivative obtained by addition of $n$ units of propylene oxide)

$= 44/(44 + 58n)$ $=$ (weight of charged $PVA$)/(weight of product)

Thus, $44/(44+58n)=10/24.63;$ and so $n=1.11.$

The structural formula is shown below. The molar substitution determined from the NMR spectrum was 1.3 and the ratio a:b was 0.61:0.39. Accordingly, L was 3.33.

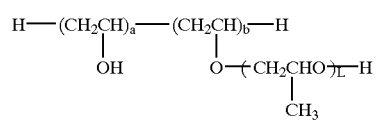

Synthesis Example 5

A reaction vessel equipped with a stirring element was charged with 10 parts by weight of polyvinyl alcohol (average degree of polymerization, 500; vinyl alcohol fraction, ≧98%) and 150 parts by weight of dioxane. An aqueous solution of 1.81 parts by weight of sodium hydroxide in 2.5 parts by weight of water was gradually added under stirring, and stirring was continued for one hour at room temperature. To this solution was gradually added 84 parts by weight of phenol (EO)$_5$ glycidyl ether (Denacol EX-145, produced by Nagase Chemicals, Ltd.), and the resulting mixture was stirred for 8 hours at 50° C. to effect the reaction. Stirring was stopped following reaction completion, whereupon the polymer precipitated from the mixture. The precipitate was collected, dissolved in 400 parts by weight of water and neutralized with acetic acid. The neutralized polymer was purified by dialysis, and the resulting solution was freeze-dried, giving 53.72 parts by weight of a phenol (EO)$_5$-added polymer. Based on calculations from the yield, the amount of (EO)$_5$ introduced was 0.52 and the molar substitution was 2.6. The molar substitution (MS) can also be calculated as follows.

Unit molecular weight of PVA Molecular weight of phenol (EO)$_5$

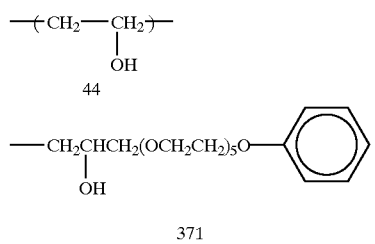

(unit molecular weight of PVA)/(unit molecular weight of PVA derivative obtained by addition of $n$ units of phenol (EO)$_5$)=44/(44+370$n$)=(weight of charged PVA)/(weight of product)

Thus,

44/(44+370$n$)=10/53.72;

and so n=0.52

MS=0.52×5=2.6

The structural formula of the reaction product is shown below. The average molar substitution by the ethylene oxide units, as determined from the NMR spectrum, was 2.6.

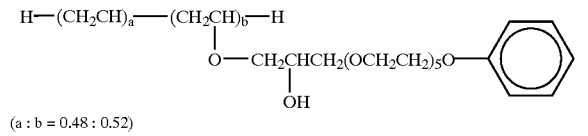

(a : b = 0.48 : 0.52)

Synthesis Example 6

A reaction vessel equipped with a stirring element was charged with 10 parts by weight of partially saponified polyvinyl acetate (average degree of polymerization, 500; vinyl alcohol fraction, 77%) and 150 parts by weight of dimethylsulfoxide. An aqueous solution of 9.1 parts by weight of sodium hydroxide in 10 parts by weight of water was gradually added under stirring, and stirring was continued for one hour at room temperature. To this solution was gradually added over a period of 3 hours a solution of 67 parts by weight of glycidol in 100 parts by weight of dimethylsulfoxide. The resulting mixture was stirred for 8 hours at 50° C. to effect the reaction. Following reaction completion, the uniform solution that was obtained was diluted with water and neutralized with acetic acid. The neutralized solution was purified by dialysis, and the resulting solution was freeze-dried, giving 23.45 parts by weight of a dihydroxypropylated polyvinyl alcohol. The dihydroxypropyl units introduced onto the polyvinyl alcohol had an average molar substitution, as calculated from the yield, of 0.8. The molar substitution determined from the NMR spectrum was 0.98. The ratio a:b was 0.48:0.52, and L was 1.88.

Synthesis Example 7

A reaction vessel equipped with a stirring element was charged with 10 parts by weight of poly(ethylene vinyl alcohol) (average degree of polymerization, 400; vinyl alcohol fraction, 71%) and 100 parts by weight of dimethylsulfoxide. An aqueous solution of 1.29 parts by weight of sodium hydroxide in 7.3 parts by weight of water was gradually added under stirring, and stirring was continued for one hour at room temperature. To this solution was gradually added over a period of 3 hours a solution of 47.8 parts by weight of glycidol in 40 parts by weight of dimethylsulfoxide. The resulting mixture was stirred for 8 hours at 50° C. to effect the reaction. Following reaction completion, the uniform solution that was obtained was diluted with water and neutralized with acetic acid. The neutralized solution was purified by dialysis, and the resulting solution was freeze-dried, giving 25.0 parts by weight of a dihydroxypropylated poly(ethylene vinyl alcohol). The average molar substitution by the dihydroxypropyl units introduced onto the poly(ethylene vinyl alcohol), as calculated from the yield, was 0.8. The molar substitution can also be calculated as follows.

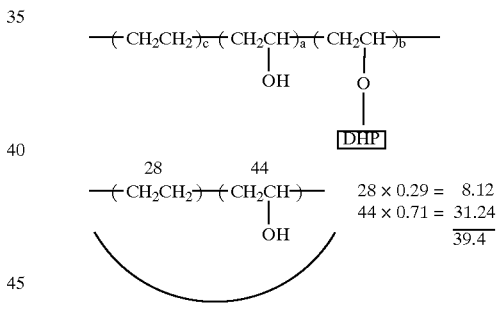

(unit molecular weight of EVA)/(unit molecular weight of EVA derivative obtained by addition of $n$ units of glycidol)

= 39.4/(39.4 + 74$n$)

= (weight of charged PVA)/(weight of product)

Thus, 39.4/(39.4+74$n$)=10/25.0;

and so n=0.8

The molar substitution determined from the NMR spectrum was 0.82. The percent conversion of the PVA unit portions of the molecule is apparent from the ratio c:a:b, which was 0.29:0.53:0.18. L was found from this to be 4.44.

TABLE 2

| | Starting polymer (average degree of polymerization) | PVA unit fraction | Reagent | Molar substitution calculated from yield |
|---|---|---|---|---|
| Syn. Ex. 1 | PVA (500) | ≧98% | glycidol | 0.74 |
| Syn. Ex. 2 | PVA (500) | ≧98% | glycidol | 1.37 |
| Syn. Ex. 3 | PVA (500) | ≧98% | glycidol | 1.19 |
| Syn. Ex. 4 | PVA (500) | ≧98% | propylene oxide | 1.11 |
| Syn. Ex. 5 | PVA (500) | ≧98% | phenol (EO)$_5$ glycidyl ether | 2.6 |
| Syn. Ex. 6 | partially saponified polyvinyl acetate (500) | 77% | glycidol | 0.8 |
| Syn. Ex. 7 | poly(ethylene vinyl alcohol) (400) | 71% | glycidol | 0.8 |

Synthesis Example 8

Cyanoethylation

Three parts by weight of the polymer prepared in Synthesis Example 1 was mixed with 20 parts by weight of dioxane and 14 parts by weight of acrylonitrile. To this mixed solution was added 0.16 part by weight of sodium hydroxide dissolved in 1 part by weight of water, and stirring was carried out for 10 hours at 25° C. The resulting mixture was neutralized using the ion-exchange resin produced by Organo Corporation under the trade name Amberlite IRC-76. The ion-exchange resin was separated off by filtration, after which 50 parts by weight of acetone was added to the solution and the insolubles were filtered off. The resulting acetone solution was placed in dialysis membrane tubing and dialyzed with running water. The polymer which precipitated within the dialysis membrane tubing was collected and re-dissolved in acetone. The resulting solution was filtered, following which the acetone was evaporated off, giving a cyanoethylated polymer derivative. The polymer derivative was dried in vacuo, then used to measure the conductivity. The infrared absorption spectrum of this polymer derivative showed no hydroxyl group absorption, confirming that all the hydroxyl groups were capped with cyanoethyl groups (capping ratio, 100%).

Synthesis Examples 9 to 14

Cyanoethylation

A cyanoethylated polymer derivative was prepared in each of these examples in the same manner as in Synthesis Example 8 by cyanoethylating the respective polymers obtained in Synthesis Examples 2 to 7. The infrared absorption spectra of the resulting polymer derivatives showed no hydroxyl group absorption, confirming that all the hydroxyl groups were capped with cyanoethyl groups (capping ratio, 100%).

EXAMPLES 1 TO 7

Electrolyte Compositions for Electric Double-Layer Capacitors (1)

The respective cyanoethylated polymer derivatives prepared in Synthesis Examples 8 to 14 were dissolved together with tetraethylammonium tetrafluoroborate (($C_2H_5$)$_4$NBF$_4$) in tetrahydrofuran such as to set the combined weight of ($C_2H_5$)$_4$NBF$_4$ and the polymer derivative in each example at 1 kg. The resulting solution was held under reduced pressure to allow the tetrahydrofuran to evaporate, giving a polymer derivative-supported electrolyte complex (electrolyte composition for electric double-layer capacitor).

The conductivity and bond strength of each of the resulting compositions (complexes) were measured as described below. The room-temperature state was visually evaluated. In addition, the resulting composition was held at 100° C. for 5 hours, and the percent weight loss by evaporation was measured. The results are shown in Table 3.

Conductivity

The complex was placed between two copper sheets separated by a 200 μm gap, and the conductivity was determined by AC impedance measurement.

Bond Strength

The bond strength was determined based on the peel-type bond strength test procedure standards for adhesives set forth in JIS K6854. Specifically, a copper sheet with a thickness of 0.6 mm, a width of 25.5±0.2 mm and a length of 300 mm that had been surface-treated with sandpaper was used as the adherend. The electrolyte composition for electric double-layer capacitors was applied to the copper adherend as a layer of bonding material, thereby giving a T-peel test piece. Both ends of the test piece were attached to fixable clamps on a testing machine, and measurement was carried out. The crosshead rate was set at 100±0.2 mm/min, and crosshead movement was continued until the portion of the test piece remaining bonded was about 10 mm. The measurement results were subjected to best-fit straight line approximation, and the peel-type bond strength was determined from the resulting peel load in accordance with JIS Z8401.

Comparative Example 1

A polyethylene glycol-supported electrolyte complex (electrolyte composition for electric double-layer capacitors) was prepared by the same method as in Example 1, except that polyethylene glycol having a weight-average molecular weight of 2000 (PEG 2000) was used as the polymer.

The conductivity and bond strength of the resulting complex were measured by the methods described below. The room-temperature state was visually evaluated. In addition, the complex obtained in this example was held at 100° C. for 5 hours, and the percent weight loss by evaporation was measured. The results are presented in Table 4.

Comparative Example 2

A hydroxypropyl cellulose-supported electrolyte complex (electrolyte composition for electric double-layer capacitors) was prepared by the same method as in Example 1, except that hydroxypropyl cellulose was used as the polymer.

The conductivity and bond strength of the resulting complex were measured by the methods described below. The room-temperature state was visually evaluated. In addition, the complex obtained in this example was held at 100° C. for 5 hours, and the percent weight loss by evaporation was measured. The results are presented in Table 4.

Comparative Example 3

A cyanoethylated hydroxypropyl cellulose-supported electrolyte complex (electrolyte composition for electric double-layer capacitors) was prepared by the same method as in Example 1, except that cyanoethylated hydroxypropyl cellulose was used as the polymer.

The conductivity and bond strength of the resulting complex were measured by the methods described below. The room-temperature state was visually evaluated. In addition, the complex obtained in this example was held at 100° C. for 5 hours, and the percent weight loss by evaporation was measured. The results are presented in Table 4.

TABLE 3

|  | Conductivity (S/cm) | Bond strength (kN/m) | Room-temperature state | Weight loss by evaporation |
|---|---|---|---|---|
| Example 1 | $6.30 \times 10^{-4}$ | 0.72 | rubbery solid | <0.1% |
| Example 2 | $3.80 \times 10^{-4}$ | 0.70 | rubbery solid | <0.1% |
| Example 3 | $2.30 \times 10^{-4}$ | 0.71 | rubbery solid | <0.1% |
| Example 4 | $2.40 \times 10^{-4}$ | 0.80 | rubbery solid | <0.1% |
| Example 5 | $1.00 \times 10^{-4}$ | 0.81 | rubbery solid | <0.1% |
| Example 6 | $0.80 \times 10^{-4}$ | 0.62 | rubbery solid | <0.1% |
| Example 7 | $2.00 \times 10^{-4}$ | 0.56 | rubbery solid | <0.1% |

TABLE 4

|  | Comp. Ex. 1 | Comp. Ex. 2 | Comp. Ex. 3 |
|---|---|---|---|
| Conductivity (S/cm) | $8.50 \times 10^{-6}$ | $7.60 \times 10^{-6}$ | $6.80 \times 10^{-4}$ |
| Bond strength (kN/m) | <0.01 (not measurable) | <0.01 (not measurable) | <0.1 (weak adhesion) |
| Room-temperature state | solid | solid | rubbery solid |
| Weight loss by evaporation | <0.1% | <0.1% | <0.1% |

EXAMPLES 8 TO 14

Electrolyte Compositions (2) and Solid Polymer Electrolytes (1) for Electric Double-Layer Capacitors The respective polymer derivatives prepared in Synthesis Examples 8 to 14 were dissolved together with tetraethylammonium tetrafluoroborate $((CH_2H_5)_4NBF_4)$ in tetrahydrofuran. In each example, the resulting solution was held under reduced pressure to allow the tetrahydrofuran to evaporate. Next, predetermined amounts of polyethylene glycol dimethacrylate (number of oxyethylene units=9, referred to hereinafter as "crosslinking agent 1") and methoxypolyethylene glycol monomethacrylate (number of oxyethylene units=9, "crosslinking agent 2") were added. Azobisisobutyronitrile was also added, and the ingredients were charged into a reactor such that the amount of $(CH_2H_5)_4NBF_4$ was 1 mole per kilogram of the combined weight of the ingredients.

That is, the ingredients were charged in such a way that the weight of $(CH_2H_5)_4NBF_4$ plus the weight of the polymer derivative plus the weight of polyethylene glycol dimethacrylate plus the weight of methoxypolyethylene glycol monomethacrylate plus the weight of azobisisobutyronitrile was 1 kilogram per mole of the $(CH_2H_5)_4NBF_4$, thereby giving the electrolyte compositions for electric double-layer capacitors of Examples 8 to 14.

The resulting compositions were cast using a doctor knife applicator, then heated at 100° C. for 1 hour to induce curing, thereby giving the solid polymer electrolytes (films) for electric double-layer capacitors of Examples 8 to 14.

The electrical conductivity and bond strength of each of the resulting solid polymer electrolytes (films) were measured by the methods described below. In addition, the room-temperature state of the solid polymer electrolyte was visually evaluated (S: soft paste-like solid; L: highly viscous liquid). Moreover, the solid polymer electrolytes obtained in these examples were held at 100° C. for 5 hours, and the percent weight loss by evaporation was measured. The results are presented in Table 5.

Conductivity

The solid polymer electrolyte was rendered into a 200 μm film, sandwiched between two copper sheets, and the conductivity was determined by AC impedance measurement.

Bond Strength

The bond strength was determined based on the peel-type bond strength test procedure standards for adhesives set forth in JIS K6854. Specifically, copper sheets with a thickness of 0.6 mm, a width of 25.45±0.2 mm and a length of 300 mm that had been surface-treated with sandpaper were used as the adherend. The electrolyte composition for electric double-layer capacitors was applied between the copper adherends as a bonding layer, thereby giving a T-peel test piece. Both ends of the test piece were attached to fixable clamps on a testing machine, and measurement was carried out. The crosshead was moved at a speed of 100±0.2 mm/min, and crosshead movement was continued until the portion of the test piece remaining bonded was about 10 mm. The measurement results were subjected to best-fit straight line approximation, and the peel-type bond strength was determined from the resulting peel load in accordance with JIS Z8401.

EXAMPLES 15 TO 17

Electrolyte Compositions (3) and Solid Polymer Electrolytes (2) for Electric Double-Layer Capacitors The respective polymer derivatives prepared in Synthesis Examples 8, 11 and 14 were dissolved together with tetraethylammonium tetrafluoroborate $((CH_2H_5)_4NBF_4)$ in tetrahydrofuran. In each example, the resulting solution was held under reduced pressure to allow the tetrahydrofuran to evaporate. Next, a predetermined amount of a polyurethane crosslinking agent composed of a mixture of liquid polyol and liquid isocyanate was added. The liquid polyol used for this purpose was a glycerol-based ethylene oxide/polyethylene oxide=8:2 copolymeric polyol (OH value= 1.215 mg/kg; referred to hereinafter as "crosslinking agent 3"). The liquid isocyanate used was polyisocyanate (NCO value=7.381 mg/kg; "crosslinking agent 4"). The respective ingredients were charged in such a way that the weight of $(CH_2H_5)_4NBF_4$ plus the weight of the polymer derivative plus the weight of the liquid polyol plus the weight of the isocyanate liquid was 1 kilogram per mole of the $(CH_2H_5)_4NBF_4$, thereby giving the electrolyte compositions for electric double-layer capacitors of Examples 15 to 17.

The resulting compositions were cast using a doctor knife applicator, then heated at 100° C. for 1 hour to induce curing, thereby giving the solid polymer electrolytes (films) for electric double-layer capacitors of Examples 15 to 17.

The conductivity and bond strength of each of the resulting solid polymer electrolytes (films) were measured by the same method as in Examples 8 to 14 above. In addition, the room-temperature state of the solid polymer electrolyte was visually evaluated (S: soft paste-like solid; L: highly viscous liquid). Moreover, the solid polymer electrolytes obtained in these examples were held at 100° C. for 5 hours, and the percent weight loss by evaporation was measured. The results are presented in Table 6.

EXAMPLE 18

Nonaqueous Solvent-Containing Electrolyte Composition and Solid Polymer Electrolyte for Electric Double-Layer Capacitor A mixture was prepared by adding 0.2 part of polyethylene glycol dimethacrylate (number of oxyethylene units=9; crosslinking agent 1) and 0.2 part of methoxypolyethylene glycol monomethacrylate (number of oxyethylene units=9, crosslinking agent 2) to 1 part of the polymer derivative from Synthesis Example 8, and adding also azobisisobutyronitrile.

The mixture was then dissolved in a 1 mol/L solution of tetraethylammonium tetrafluoroborate $(C_2H_5)_4NBF_4$ dissolved in 1.4 parts of the nonaqueous solvent propylene carbonate such as to set the weight ratio of the mixture to the nonaqueous solvent at 1:1, thereby giving an electrolyte composition for electric double-layer capacitors.

The resulting composition was cast using a doctor knife applicator, then heated at 100° C. for 1 hour to induce curing, thereby giving a solid polymer electrolyte (film) for electric double-layer capacitors.

The conductivity and bond strength of the resulting solid polymer electrolyte (film) were measured by the same methods as in Examples 8 to 14 above. In addition, the room-temperature state of the solid polymer electrolyte was visually evaluated (S: soft paste-like solid; L: highly viscous liquid). The results are presented in Table 6.

EXAMPLE 19

An electrolyte composition for electric double-layer capacitors was prepared by the same method as in Example 18, except that the polymer derivative from Synthesis Example 9 was dissolved in a 1 mol/L solution of tetraethylammonium tetrafluoroborate $(C_2H_5)_4NBF_4$ dissolved in 4.2 parts of the nonaqueous solvent propylene carbonate such as to set the weight ratio of the mixture to the nonaqueous solvent at 1:3.

The resulting composition was cast using a doctor knife applicator, then heated at 100° C. for 1 hour to induce curing, thereby giving a solid polymer electrolyte (film) for electric double-layer capacitors.

The conductivity and bond strength of the resulting solid polymer electrolyte (film) were measured by the same methods as in Examples 8 to 14 above. In addition, the room-temperature state of the solid polymer electrolyte was visually evaluated (S: soft paste-like solid; L: highly viscous liquid). The results are presented in Table 6.

Comparative Example 4

A complex (electrolyte composition for electric double-layer capacitors) was prepared by the same method as in Examples 8 to 14, except that polyethylene glycol having a weight-average molecular weight of 2000 (PEG 2000) was used as the polymer.

The conductivity and bond strength of the resulting complex were measured by the same methods as in Examples 8 to 14 above. In addition, the room-temperature state of the complex was visually evaluated (S: soft paste-like solid; L: highly viscous liquid). Moreover, the complex obtained in this example was held at 100° C. for 5 hours, and the percent weight loss by evaporation was measured. The results are presented in Table 7.

Comparative Example 5

A complex (electrolyte composition for electric double-layer capacitors) was prepared by the same method as in Examples 8 to 14, except that hydroxypropyl cellulose was used as the polymer.

The conductivity and bond strength of the resulting complex were measured by the same methods as in Examples 8 to 14 above. In addition, the room-temperature state of the complex was visually evaluated (S: soft paste-like solid; L: highly viscous liquid). Moreover, the complex obtained in this example was held at 100° C. for 5 hours, and the percent weight loss by evaporation was measured. The results are presented in Table 7.

Comparative Example 6

A complex (electrolyte composition for electric double-layer capacitors) was prepared by the same method as in Examples 8 to 14, except that cyanoethylated hydroxypropyl cellulose was used as the polymer.

The conductivity and bond strength of the resulting complex were measured by the same methods as in Examples 8 to 14 above. In addition, the room-temperature state of the complex was visually evaluated (S: soft paste-like solid; L: highly viscous liquid). Moreover, the complex obtained in this example was held at 100° C. for 5 hours, and the percent weight loss by evaporation was measured. The results are presented in Table 7.

TABLE 5

| | (parts by weight) | | | | | | |
|---|---|---|---|---|---|---|---|
| | Example 8 | Example 9 | Example 10 | Example 11 | Example 12 | Example 13 | Example 14 |
| Polymer derivative | | | | | | | |
| Syn. Ex. 8 | 1 | | | | | | |
| Syn. Ex. 9 | | 1 | | | | | |
| Syn. Ex. 10 | | | 1 | | | | |
| Syn. Ex. 11 | | | | 1 | | | |
| Syn. Ex. 12 | | | | | 1 | | |
| Syn. Ex. 13 | | | | | | 1 | |
| Syn. Ex. 14 | | | | | | | 1 |
| Crosslinking agent | | | | | | | |
| Crosslinker 1 | 0.2 | 0.2 | 0.3 | 0.3 | 0.3 | 0.3 | 0.2 |
| Crosslinker 2 | 0.2 | 0.2 | 0.2 | 0.3 | 0.3 | 0.2 | 0.3 |
| Conductivity (S/cm) | $4.50 \times 10^{-4}$ | $5.90 \times 10^{-4}$ | $4.00 \times 10^{-4}$ | $1.60 \times 10^{-4}$ | $9.20 \times 10^{-5}$ | $1.80 \times 10^{-4}$ | $1.50 \times 10^{-4}$ |
| Bond strength (kN/m) | 0.82 | 0.90 | 1.18 | 0.66 | 0.72 | 1.21 | 0.62 |
| Room-temperature state | S | S | S | S | S | S | S |
| Weight loss by evaporation (%) | <0.1 | <0.1 | <0.1 | <0.1 | <0.1 | <0.1 | <0.1 |

Crosslinker 1: Polyethylene glycol dimethacrylate
Crosslinker 2: Methoxypolyethylene glycol monomethacrylate
Room-Temperature State:

TABLE 5-continued

|  | (parts by weight) | | | | | | |
|---|---|---|---|---|---|---|---|
|  | Example 8 | Example 9 | Example 10 | Example 11 | Example 12 | Example 13 | Example 14 |

S: Soft pasty solid
L: Highly viscous liquid

TABLE 6

|  | (parts by weight) | | | | |
|---|---|---|---|---|---|
|  | Example 15 | Example 16 | Example 17 | Example 18 | Example 19 |
| Polymer derivative |  |  |  |  |  |
| Syn. Ex. 8 | 1 |  |  | 1 |  |
| Syn. Ex. 9 |  |  |  |  | 1 |
| Syn. Ex. 10 |  | 1 |  |  |  |
| Syn. Ex. 11 |  |  | 1 |  |  |
| Nonaqueous solvent (propylene carbonate) | — | — | — | 1.4 | 4.2 |
| Crosslinking agent |  |  |  |  |  |
| Crosslinker 1 |  |  |  | 0.2 | 0.2 |
| Crosslinker 2 |  |  |  | 0.2 | 0.2 |
| Crosslinker 3 | 0.17 | 0.256 | 0.256 |  |  |
| Crosslinker 4 | 0.03 | 0.044 | 0.044 |  |  |
| Conductivity (S/cm) | $4.70 \times 10^{-4}$ | $1.80 \times 10^{-4}$ | $1.90 \times 10^{-4}$ | $1.70 \times 10^{-3}$ | $3.70 \times 10^{-3}$ |
| Bond strength (kN/m) | 1.09 | 1.00 | 0.61 | 0.38 | 0.24 |
| Room-temperature state | S | S | S | S | S |
| Weight loss by evaporation (%) | <0.1 | <0.1 | <0.1 | — | — |

Crosslinker 1: Polyethylene glycol dimethacrylate
Crosslinker 2: Methoxypolyethylene glycol monomethacrylate
Crosslinker 3: Ethylene oxide-polyethylene oxide copolymeric polyol
Crosslinker 4: Polyisocyanate
Room-Temperature State:
S: Soft pasty solid
L: Highly viscous liquid

TABLE 7

|  | (parts by weight) | | |
|---|---|---|---|
|  | Comp. Ex. 4 | Comp. Ex. 5 | Comp. Ex. 6 |
| Polymer |  |  |  |
| PEG 2000 | 1 |  |  |
| Hydroxypropyl cellulose |  | 1 |  |
| Cyanoethylated hydroxypropyl cellulose |  |  | 1 |
| Crosslinking agent |  |  |  |
| Crosslinker 3 | 1.5 | 0.5 | 0.5 |
| Crosslinker 4 | 1.5 | 1.5 | 1.5 |
| Conductivity (S/cm) | $1.80 \times 10^{-6}$ | $2.00 \times 10^{-6}$ | $3.90 \times 10^{-4}$ |
| Bond strength (kN/m) | <0.01 (not measurable) | <0.01 (not measurable) | <0.1 (weak bond strength) |
| Room-temperature state | S | S | S |
| Weight loss by evaporation (%) | <0.1 | <0.1 | <0.1 |

Crosslinker 1: Polyethylene glycol dimethacrylate
Crosslinker 2: Methoxypolyethylene glycol monomethacrylate
Room-Temperature State:
S: Soft pasty solid
L: Highly viscous liquid The electrolyte compositions and solid polymer electrolytes for electric double-layer capacitors of the invention are endowed with high ionic conductivity, high tackiness and, particularly in Examples 8 to 19, excellent shape retention. Hence, they are perfectly suited for use as solid polymer electrolytes (separators) for electric double-layer capacitors.

EXAMPLE 20

Polarizable Electrode-forming Composition and Polarizable Electrode (1)

Phenol-derived activated carbon (manufactured by Kansai Netsukagaku K.K.; specific surface, 1860 m²/g; average particle size, 16 μm) as the large surface area material and carbon black (average particle size, 20 nm) as the conductive material were added in a weight ratio (activated carbon/carbon black) of 18:2 and mixed.

The resulting powder mixture, the polymer derivative from Synthesis Example 8, and N-methylpyrrolidone were mixed in a weight ratio (powder mixture/polymer derivative/N-methylpyrrolidone) of 20:1:30 to form a polarizable electrode-forming composition.

The polarizable electrode-forming composition was cast onto an aluminum current collector using a doctor knife applicator, then held at 80° C. for 2 hours to evaporate off the N-methylpyrrolidone, thereby giving a polarizable electrode.

EXAMPLE 21

Polarizable Electrode-forming Composition and Polarizable Electrode (2)

Phenol-derived activated carbon (manufactured by Kansai Netsukagaku K.K.; specific surface, 1860 m²/g; average particle size, 16 μm) as the large surface area material and carbon black (average particle size, 20 nm) as the powdery conductive material were added in a weight ratio (activated carbon/carbon black) of 18:2 and mixed.

A binder resin was prepared by adding 0.2 part of polyethylene glycol dimethacrylate (number of oxyethylene units=9; crosslinking agent 1) and 0.2 part of methoxypolyethylene glycol monomethacrylate (number of oxyethylene units=9; crosslinking agent 2) to 1 part of the polymer derivative from Synthesis Example 8, and mixing.

The resulting powder mixture, the binder resin, and N-methylpyrrolidone as the diluting solvent were mixed in a weight ratio (powder mixture/binder resin/N-methylpyrrolidone) of 20:1:30 to form a polarizable electrode-forming composition.

The polarizable electrode-forming composition was cast onto an aluminum current collector using a doctor knife applicator, then held at 80° C. for 2 hours to evaporate off the N-methylpyrrolidone, thereby giving a polarizable electrode.

EXAMPLE 22
Electric Double-Layer Capacitor (1)

A separator composed of a separator substrate (PTFE porous film) impregnated with a 1 mol/L solution of tetraethylammonium tetrafluoroborate $((C_2H_5)_4NBF_4)$ dissolved in the nonaqueous solvent propylene carbonate was placed between a pair of the polarizable electrodes obtained in Example 20 and pressure was applied, giving a film-type electric double-layer capacitor.

The film-type electric double-layer capacitor thus obtained had an aluminum current collector/polarizable electrode/separator/polarizable electrode/aluminum current collector construction, was capable of being charged and discharged, and functioned effectively as an electric double-layer capacitor.

EXAMPLE 23
Electric Double-Layer Capacitor (2)

A separator composed of a separator substrate (PTFE porous film) impregnated with a 1 mol/L solution of tetraethylammonium tetrafluoroborate $((C_2H_5)_4NBF_4)$ dissolved in the nonaqueous solvent propylene carbonate was placed between a pair of the polarizable electrodes obtained in Example 21 and pressure was applied, giving a film-type electric double-layer capacitor.

The film-type electric double-layer capacitor thus obtained had an aluminum current collector/polarizable electrode/separator/polarizable electrode/aluminum current collector construction, was capable of being charged and discharged, and functioned effectively as an electric double-layer capacitor.

EXAMPLE 24
Electric Double-Layer Capacitor (3)

A separator composed of a separator substrate (PTFE porous film) coated or impregnated with the electrolyte composition for electric double-layer capacitors of Example 1 was placed between a pair of the polarizable electrodes obtained in Example 20 and pressure was applied, giving a film-type electric double-layer capacitor.

The film-type electric double-layer capacitor thus obtained had an aluminum current collector/polarizable electrode/separator/polarizable electrode/aluminum current collector construction in which the electrodes and separator were strongly bonded, was capable of being charged and discharged, and functioned effectively as an electric double-layer capacitor.

EXAMPLE 25
Electric Double-Layer Capacitor (4)

A separator composed of a separator substrate (PTFE porous film) coated or impregnated with the electrolyte composition for electric double-layer capacitors of Example 8 was placed between a pair of the polarizable electrodes obtained in Example 21 and pressure was applied, following which the assembly was held at 100° C. for 1 hour. This caused the composition of Example 8 disposed between the pair of polarizable electrodes to thermally polymerize and form a film-type electric double-layer capacitor.

The film-type electric double-layer capacitor thus obtained had an aluminum current collector/polarizable electrode/electrolyte (separator)/polarizable electrode/aluminum current collector construction in which the electrodes and separator were strongly bonded, was capable of being charged and discharged, and functioned effectively as an electric double-layer capacitor.

EXAMPLE 26
Electric Double-Layer Capacitor (5)

A separator composed of a separator substrate (PTFE porous film) coated or impregnated with the electrolyte composition for electric double-layer capacitors of Example 18 was placed between a pair of the polarizable electrodes obtained in Example 21 and pressure was applied, following which the assembly was held at 100° C. for 1 hour. This caused the composition of Example 18 disposed between the pair of polarizable electrodes to thermally polymerize and form a film-type electric double-layer capacitor.

The film-type electric double-layer capacitor thus obtained had an aluminum current collector/polarizable electrode/electrolyte (separator)/polarizable electrode/aluminum current collector construction in which the electrodes and separator were strongly bonded, was capable of being charged and discharged, and functioned effectively as an electric double-layer capacitor.

EXAMPLE 27
Electric Double-Layer Capacitor (6)

The electrolyte composition for electric double-layer capacitors of Example 1 was placed in a slight excess on the surface of the polarizable electrode produced in Example 20, another polarizable electrode of the same construction was stacked on top thereof, and pressure was applied such as to make the gap between the two polarizable electrodes 25 µm, thereby forming a film-type electric double-layer capacitor.

The film-type electric double-layer capacitor thus obtained had an aluminum current collector/polarizable electrode/solid polymer electrolyte layer/polarizable electrode/aluminum current collector construction in which the electrodes and separator were strongly bonded, was capable of being charged and discharged, and functioned effectively as an electric double-layer capacitor.

EXAMPLE 28
Electric Double-Layer Capacitor (7)

The electrolyte composition for electric double-layer capacitors of Example 8 was placed in a slight excess on the surface of the polarizable electrode produced in Example 21, another polarizable electrode of the same construction was stacked on top thereof, pressure was applied such as to make the gap between the two polarizable electrodes 25 µm, and the assembly was held at about 100° C. for 1 hour to effect curing.

This caused the electrolyte composition disposed between the pair of polarizable electrodes to thermally polymerize and form a solid polymer electrolyte layer, thereby giving a film-type electric double-layer capacitor.

The film-type electric double-layer capacitor thus obtained had an aluminum current collector/polarizable electrode/solid polymer electrolyte layer/polarizable electrode/aluminum current collector construction in which the electrodes and separator were strongly bonded, was capable of being charged and discharged, and functioned effectively as an electric double-layer capacitor.

EXAMPLE 29

Electric Double-Layer Capacitor (8)

The electrolyte composition for electric double-layer capacitors of Example 18 was placed in a slight excess on the surface of the polarizable electrode produced in Example 21, another polarizable electrode of the same construction was stacked on top thereof, pressure was applied such as to make the gap between the two polarizable electrodes 25 μm, and the assembly was held at about 100° C. for 1 hour to effect curing.

This caused the electrolyte composition disposed between the pair of polarizable electrodes to thermally polymerize and form a solid polymer electrolyte layer, thereby giving a film-type electric double-layer capacitor.

The film-type electric double-layer capacitor thus obtained had an aluminum current collector/polarizable electrode/solid polymer electrolyte layer/polarizable electrode/aluminum current collector construction in which the electrodes and separator were strongly bonded, was capable of being charged and discharged, and functioned effectively as an electric double-layer capacitor.

What is claimed is:

1. An electric double-layer capacitor comprising an electrolyte and a pair of polarizable electrodes with a separator disposed therebetween, characterized in that the electrolyte comprises:

(A) a polymeric compound containing polyvinyl alcohol units of formula (1)

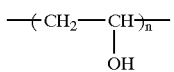

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

2. An electric double-layer capacitor comprising an electrolyte and a pair of polarizable electrodes with a separator disposed therebetween, characterized in that the electrolyte is comprised of:

(A) a polymeric compound containing polyvinyl alcohol units of formula (1)

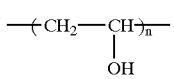

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3;

(B) an ion-conductive salt; and (C) a compound having crosslinkable functional groups.

3. The electric double-layer capacitor of claim 1 or 2 having a bond strength as determined in accordance with JIS K6854 (1994) of at least 0.1 kN/m.

4. An electric double-layer capacitor comprising an electrolyte and a pair of polarizable electrodes with a separator disposed therebetween, characterized in that the electrolyte is a solid polymer electrolyte having a semi-interpenetrating polymer network structure in which molecular chains comprising (A) a polymeric compound containing polyvinyl alcohol units of formula (1) below

are intertwined with the three-dimensional network structure of a polymer obtained by crosslinking (C) a compound having crosslinkable functional groups, and containing (B) an ion-conductive salt wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3.

5. The electric double-layer capacitor of claim 4, wherein said solid polymer electrolyte has a bond strength as determined in accordance with JIS K6854 (1994) of at least 0.1 kN/m.

6. A polarizable electrode-forming composition, comprising:

(A) a polymeric compound containing polyvinyl alcohol units of formula (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3;

(D) a large surface area material; and (E) a conductive material.

7. A polarizable electrode-forming composition, comprising:

(A) a polymeric compound containing polyvinyl alcohol units of formula (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3;

(C) a compound having crosslinkable functional groups;

(D) a large surface area material; and (E) a conductive material.

8. The polarizable electrode-forming composition of claim 6 which has a bond strength as determined in accordance with JIS K6854 (1994) of at least 0.1 kN/m.

9. A polarizable electrode produced by coating the polarizable electrode-forming composition of any one of claims 6 to 8 and 14 onto a current collector.

10. An electric double-layer capacitor comprising a pair of polarizable electrodes with a separator disposed therebetween, characterized in that the pair of polarizable electrodes are polarizable electrodes according to claim 9 and the separator is comprised of a separator substrate impregnated with an ion-conductive salt-containing solution.

11. An electric double-layer capacitor comprising a pair of polarizable electrodes with a separator disposed therebetween, characterized in that the pair of polarizable electrodes are polarizable electrodes according to claim 9 and the separator is comprised of a separator substrate coated or impregnated with the electrolyte composition for an electric double-layer capacitor having (A) a polymeric compound containing polyvinyl alcohol units of formula (1)

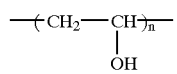  (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

12. An electric double-layer capacitor comprising a pair of polarizable electrodes with a separator disposed therebetween, characterized in that the pair of polarizable electrodes are polarizable electrodes according to claim 9 and the separator is a solid polymer electrolyte layer comprised of the electrolyte composition for electric double-layer capacitors having (A) a polymeric compound containing polyvinyl alcohol units of formula (1)

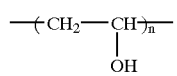  (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

13. An electric double-layer capacitor comprising a pair of polarizable electrodes with a separator disposed therebetween, characterized in that the pair of polarizable electrodes are polarizable electrodes according to claim 9 and the separator is a solid polymer electrolyte for electric double-layer capacitors having a semi-interpenetrating polymer network structure in which molecular chains comprise (A) a polymeric compound containing polyvinyl alcohol units of formula (1)

  (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

14. The polarizable electrode-forming composition of claim 7 which has a bond strength as determined in accordance with JIS K6854 (1994) of at least 0.1 kN/m.

15. An electric double-layer capacitor comprising a pair of polarizable electrodes with a separator disposed therebetween, characterized in that the pair of polarizable electrodes are polarizable electrodes according to claim 9 and the separator is comprised of a separator substrate coated or impregnated with the electrolyte composition for an electric double-layer capacitor having (A) a polymeric compound containing polyvinyl alcohol units of formula (1)

  (1)

wherein n is a number of at least 20, and having an average degree of polymerization of at least 20, in which compound some or all of the hydroxyl groups on the polyvinyl alcohol units are substituted with oxyalkylene-containing groups to an average molar substitution of at least 0.3; and (B) an ion-conductive salt.

16. The electric double-layer capacitor of claim 13, wherein the solid polymer electrolyte has a bond strength as determined in accordance with JIS K6854 (1994) of at least 0.1 kN/m.

* * * * *